(12) United States Patent
Simons et al.

(10) Patent No.: US 7,873,534 B2
(45) Date of Patent: Jan. 18, 2011

(54) COLLECTING CRM DATA FOR FEEDBACK

(75) Inventors: Alex A. Simons, Redmond, WA (US);
Wan Li Zhu, Redmond, WA (US);
Chris Shoring, Fall City, WA (US);
David C. West, Port Orchard, WA (US)

(73) Assignee: Microsoft Corporation, Redmond, WA (US)

( * ) Notice: Subject to any disclaimer, the term of this patent is extended or adjusted under 35 U.S.C. 154(b) by 1344 days.

(21) Appl. No.: 11/353,772

(22) Filed: Feb. 14, 2006

(65) Prior Publication Data

US 2007/0192162 A1    Aug. 16, 2007

(51) Int. Cl.
*G06F 17/30* (2006.01)
(52) U.S. Cl. ....................................................... 705/10
(58) Field of Classification Search .................... 705/10
See application file for complete search history.

(56) References Cited

U.S. PATENT DOCUMENTS

| | | | | |
|---|---|---|---|---|
| 4,435,759 | A * | 3/1984 | Baum et al. ................... 714/44 |
| 5,483,468 | A * | 1/1996 | Chen et al. ................... 702/186 |
| 5,909,581 | A |   6/1999 | Park et al. |
| 5,910,987 | A * | 6/1999 | Ginter et al. .................. 705/52 |
| 6,006,034 | A |  12/1999 | Heath et al. |
| 6,112,181 | A * | 8/2000 | Shear et al. ................... 705/10 |
| 6,151,643 | A |  11/2000 | Cheng et al. |
| 6,151,707 | A * | 11/2000 | Hecksel et al. ............... 717/178 |
| 6,766,318 | B1 * | 7/2004 | Guay et al. ........................ 1/1 |
| 6,990,660 | B2 * | 1/2006 | Moshir et al. ................ 717/171 |
| 2002/0120519 | A1 * | 8/2002 | Martin et al. .................. 705/21 |
| 2002/0161778 | A1 * | 10/2002 | Linstedt ....................... 707/102 |
| 2003/0078807 | A1 |   4/2003 | Cole et al. |
| 2004/0117387 | A1 |   6/2004 | Civetta et al. |
| 2004/0133551 | A1 * | 7/2004 | Linstedt ........................ 707/1 |
| 2005/0033631 | A1 |   2/2005 | Wefers et al. |
| 2005/0033762 | A1 |   2/2005 | Kasravi et al. |

OTHER PUBLICATIONS

Cograve, Frank. Is someone using spyware to monitor how your employees are using their computers? Computer Weekly pp. 38 Nov. 11, 2003.*
"Microsoft Business Solutions CRM Database Profile Wizard," Microsoft Corporation 2005, http://www.microsoft.com/downloads/details.aspx?FamilyID=9376A42A-D1F5-487A-B23F-24953F90878A&displaylang=en.
"Business Data Quality," Business Data Quality Ltd. 2005, http://www.businessdataquality.com/products/analysis/.
DataFlux Corporation, "Data Profiling—The Foundation for Data Management," KnowledgeStorm, Inc. 2005, http://www.knowledgestorm.com/sol_summary_75886.asp.

* cited by examiner

*Primary Examiner*—Johnna R Loftis
(74) *Attorney, Agent, or Firm*—Marshall, Gerstein & Borun LLP

(57) ABSTRACT

Collecting and analyzing usage data from a CRM database provides useful insights into improving future versions of CRM software. Options for the type of data to be collected may be presented and several opportunities may be available to tailor the data to be communicated to the CRM provider.

3 Claims, 26 Drawing Sheets

Microsoft CRM Database Profile Wizard

Business Data

Clear the check boxes for any data you do not want this wizard to collect.

☑ Record number — 1700
The data collected is the number of Microsoft CRM records in your database, such as accounts, contacts, and products.

☑ Business profile data — 1710
The data collected includes the number of accounts per region and per industry, the number of open and closed cases, and the number of open opportunities.

☑ Record associations — 1720
The data collected is the number of associations in the database between different records, such as the number of contacts per account or cases per contract.

☑ Organization structure — 1730
The data collected includes the number of system users and business units in your organization, and the names of security roles.

Privacy Statement

[ < Back ]  [ Next > ]  [ Cancel ] — 1740

FIG. 17

COLLECTING CRM DATA FOR FEEDBACK

BACKGROUND

One of the most difficult tasks of any software company is understanding how customers are using the existing version of the software so that improvements can be made in building the next version. Many companies choose to survey the customer explicitly. But surveys are laborious to design and administer and require significant effort on the part of the customer to fill out.

SUMMARY

Collecting and analyzing usage data from a CRM database provides useful insights into improving future versions of CRM software. Options for the type of data to be collected may be presented and several opportunities may be available to tailor the data to be communicated to the CRM provider. The data may be serialized into XML, encrypted, compressed and sent using a secure socket layer to provide security and lower bandwidth usage. The vendor may use the data to populate a vendor database where the data may be combined with data from other users to be queried against.

DRAWINGS

FIG. 10 is a partner involvement gathering display in accordance with the claims;

FIG. 12 is a partner detailed information gathering page in accordance with the claims;

FIG. 13 is an add-in program gathering display in accordance with the claims;

FIG. 17 is a business data authorization gathering display in accordance with the claims;

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
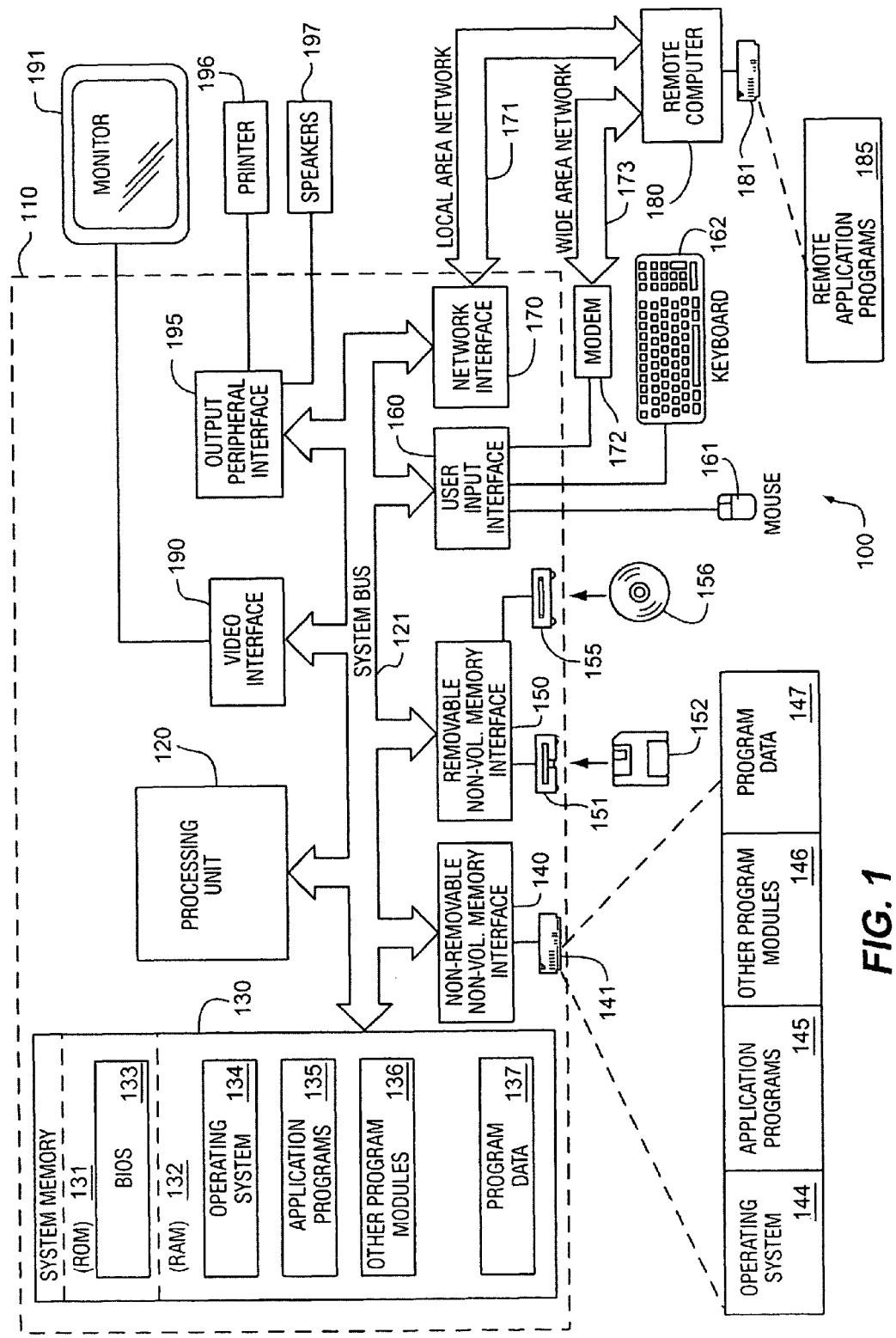
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 arid optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
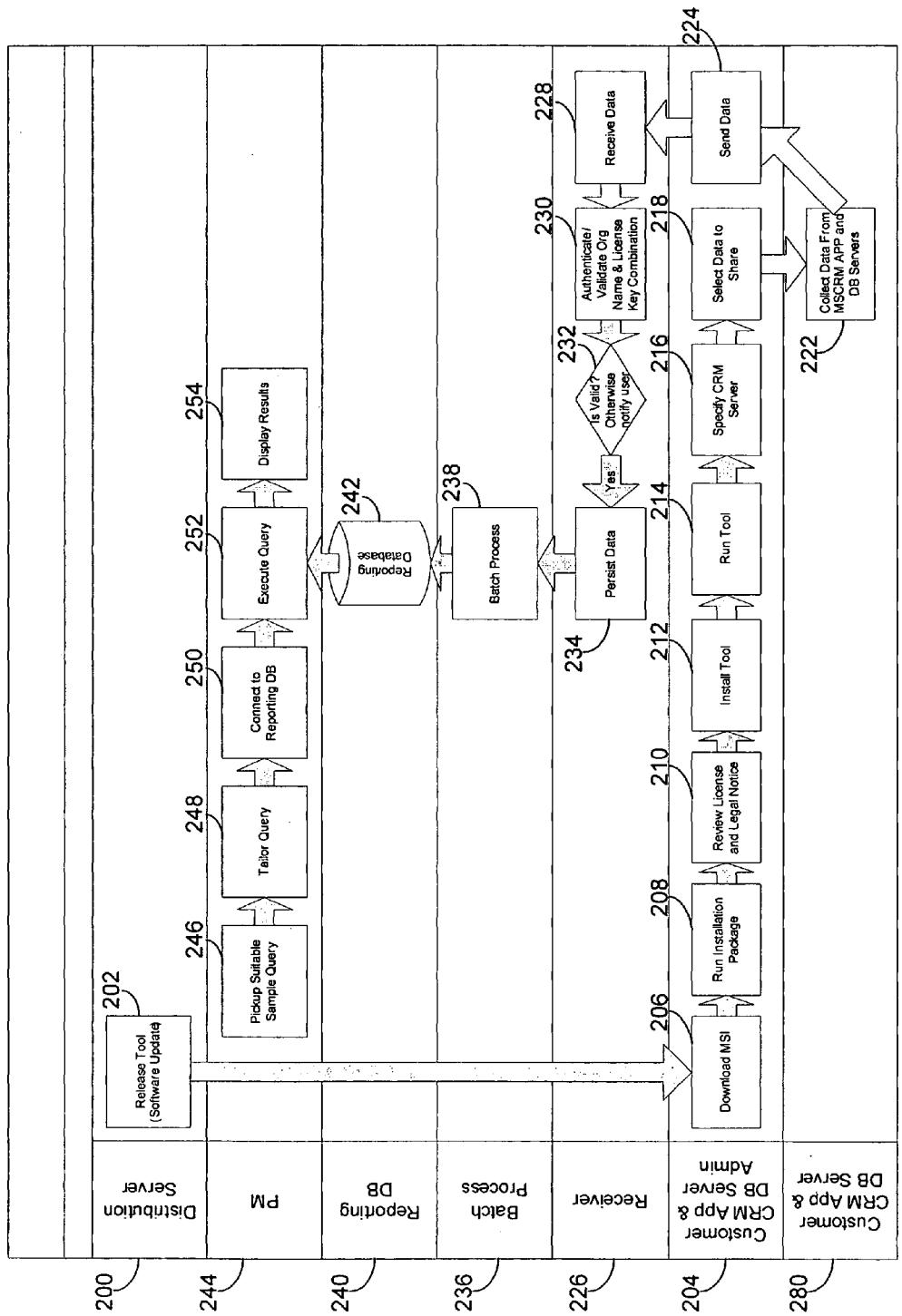
FIG. 2 is a graphical illustration of a method of collecting feedback data from a CRM program in accordance with the claims.

FIG. 2 may be a graphical illustration of a method of collecting feedback data from a Customer Relationship Management ("CRM") program. The generally accepted purpose of CRM is to enable organizations to better manage their customers through the introduction of reliable systems, processes and procedures for interacting with those customers. The method may be designed to help a software product team understand how customers are using the CRM application by gathering anonymous, descriptive data about the CRM database. The database may be a rich repository of the customer's business data and reflects the extent to which customers use certain features of the application.

At a high level, a wizard or a series of easy to execute steps may collect and send the collected data securely over the Internet to the software product team where a backend process imports the data into a reporting database. Product team members can then run queries against the reporting database to answer questions like "how many customers used feature X?" The wizard may be simple for a customer to run and the infrastructure is flexible enough that only minor modifications are necessary to handle collection of additional data.

The wizard may collect and compute several categories of database characteristics to help the product team better understand how customers are using the CRM product. Some characteristics include:

1. Customer profile through survey questions;
2. Data quantity through record counts and database size;
3. Data relationships through record associations;
4. Data growth rates through record creation dates;
5. Data customizations through database schema differences; and
6. Hardware requirements through server system information.

The client wizard may ask the user a set of optional survey questions such as industry, number of employees, date of product purchase, etc. to characterize the data set for data analysis. The wizard may allow the user to opt out of any categories of data that the user does not want the wizard to collect. The wizard may allow the user to preview the data before deciding whether to send it. The opt-out and review features ensure that the user has full control over and is fully aware of the data that is being collected.

The infrastructure may be designed with important security features. In order to allow only legitimate users to send data to the web service, the service authenticates the wizard application by requiring a valid license key and organization name pair. The wizard may run a cryptographically secure algorithm to verify that the license key and organization name matches. The data that is transmitted from the wizard to the web service may be encrypted using the HTTPS protocol to guard against eavesdropping on the communications channel. To protect the anonymity of customers who run the wizard and yet still allow the system to unique identify each data set, the system may compute a one-way hash of the organization ID which may be unique for each CRM installation. The one-way hash protects anonymity by preventing someone from deriving or backing out the originating organization ID from the hash of the organization ID.

Once the data is collected, it may be communicated to a central storage location. When the data file is received from the wizard, it may save the entire file to a file share. A process, such as a batch process, may then run periodically to parse the data file into the reporting database which is optimized for querying and reporting. To improve performance, the communication may be asynchronous operations including storing and parsing the file. Otherwise, the customer running the wizard may have to wait until the file is parsed before the wizard can exit. The data may be collected in the form of XML stream (Serialized form) and may be communicated to the software vendor through secured file share using HTTPS protocol to ensure customer anonymity.

Referring again to FIG. 2, at the Distribution Server level 200, software to execute the method may be released 202. At the customer level 204 (where the user has administrative authority), a customer or user may download an installation package 206 such as an Installer Package to start the installation. The user may then select to run the installation package 208 which may extract the necessary file and store them locally. The user may then review a license and legal notices 210. If the user accepts the license at block 210, at block 212 the method may install a tool to install the wizard program and at block 214, the method may run the tool. At block 216, the user may specify the CRM server to be used as the basis of the analysis. At block 218, the user may select the data to be shared. At the customer application level 220, the method may collect data as selected by the user from the CRM application and related servers 222. Returning again to the admin level of authority 204, the method may communicate the data 224 to the receiver level 226.

At the receiver level 226, the method may receive data 228 from the CRM installation. At block 230, the method may authenticate and/or validate the organization name and license key combination. As previously mentioned, to protect the anonymity of customers who run the wizard and yet still allow the system to unique identify each data set, the system may compute a one-way hash of the organization ID which may be unique for each CRM installation. The one-way hash protects anonymity by preventing someone from deriving or backing out the originating organization ID from the hash of the organization ID. The system may be validated based on the organization name, License GUID and the license key At block 232, the method may decide whether the organization name and license key combination is valid by comparing it to combinations it knows are valid. If the determination is no, the method may end. If the determination is yes, control may pass to block 234 where the data may be stored in a persistent data format, such as on a hard drive or a tape drive.

In the process level 236, the method may be subjected to a process, such as a batch process 238. The batch process can import the results file from block 222 into the reporting database by reading a data map file which defines what data goes into which column of which table. The data map file may be defined according to the data that is collected as specified in the input file. At the reporting database level 240, the data is then stored in the reporting database 242.

At the project manager level 244, after the data is imported into the reporting database, users may design reports or queries to analyze the data in the database. Sample queries may be used 246, or queries may be tailored 248. The queries may then be executed against the reporting database from step 242 and the results of the query would be displayed 254.

Figure 3A:
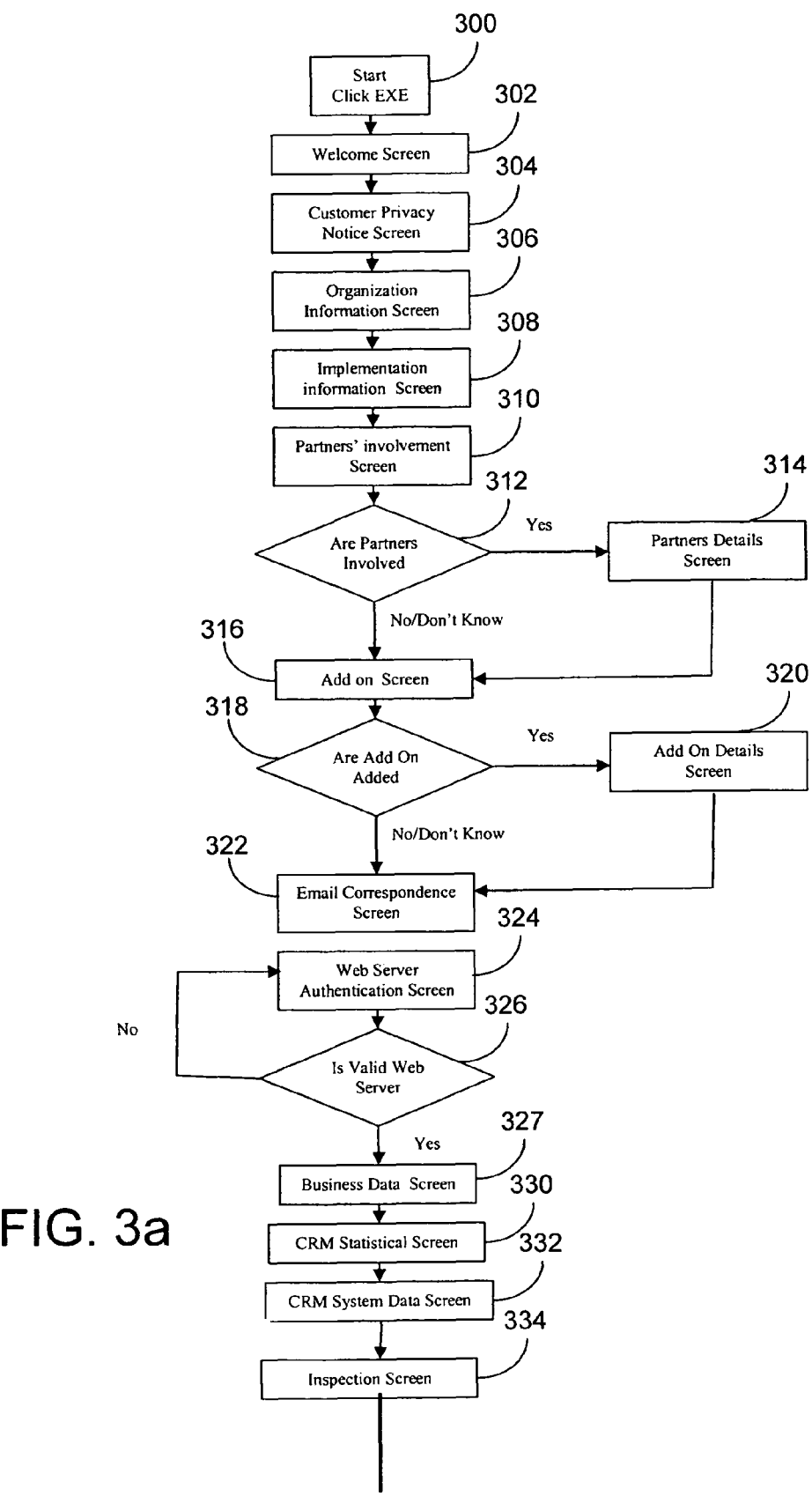
FIGS. 3a and 3b are more detailed flowcharts of one embodiment of the method in accordance with the claims.
Figure 3B:
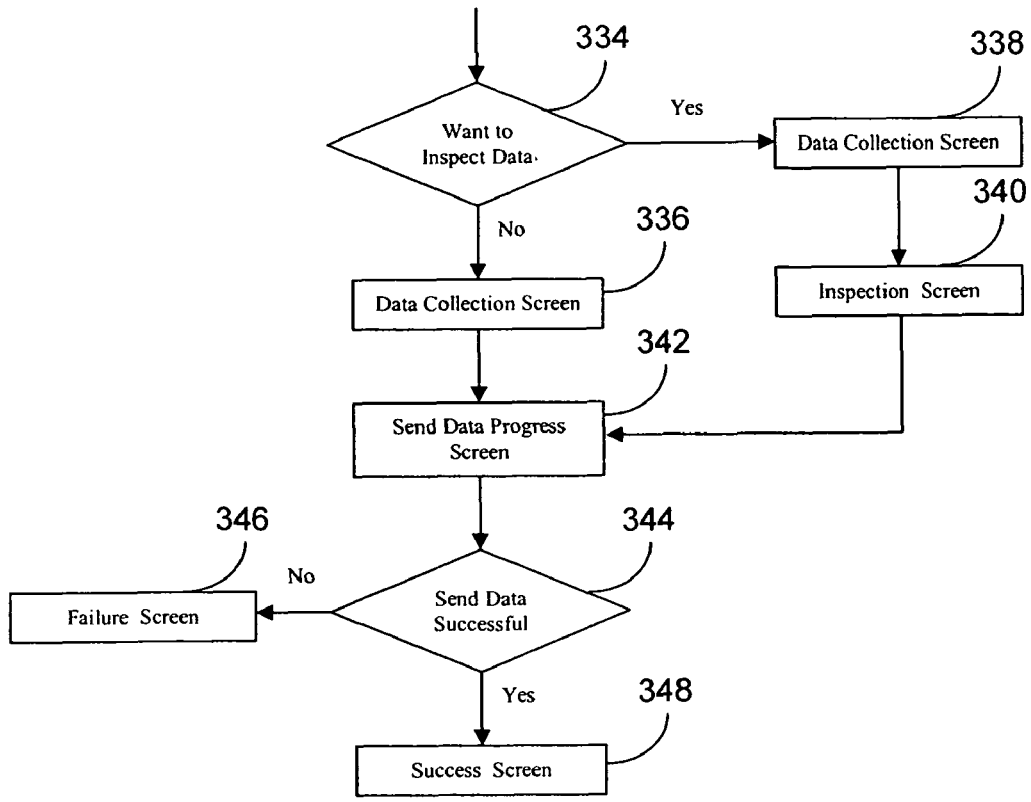
Figure 6:
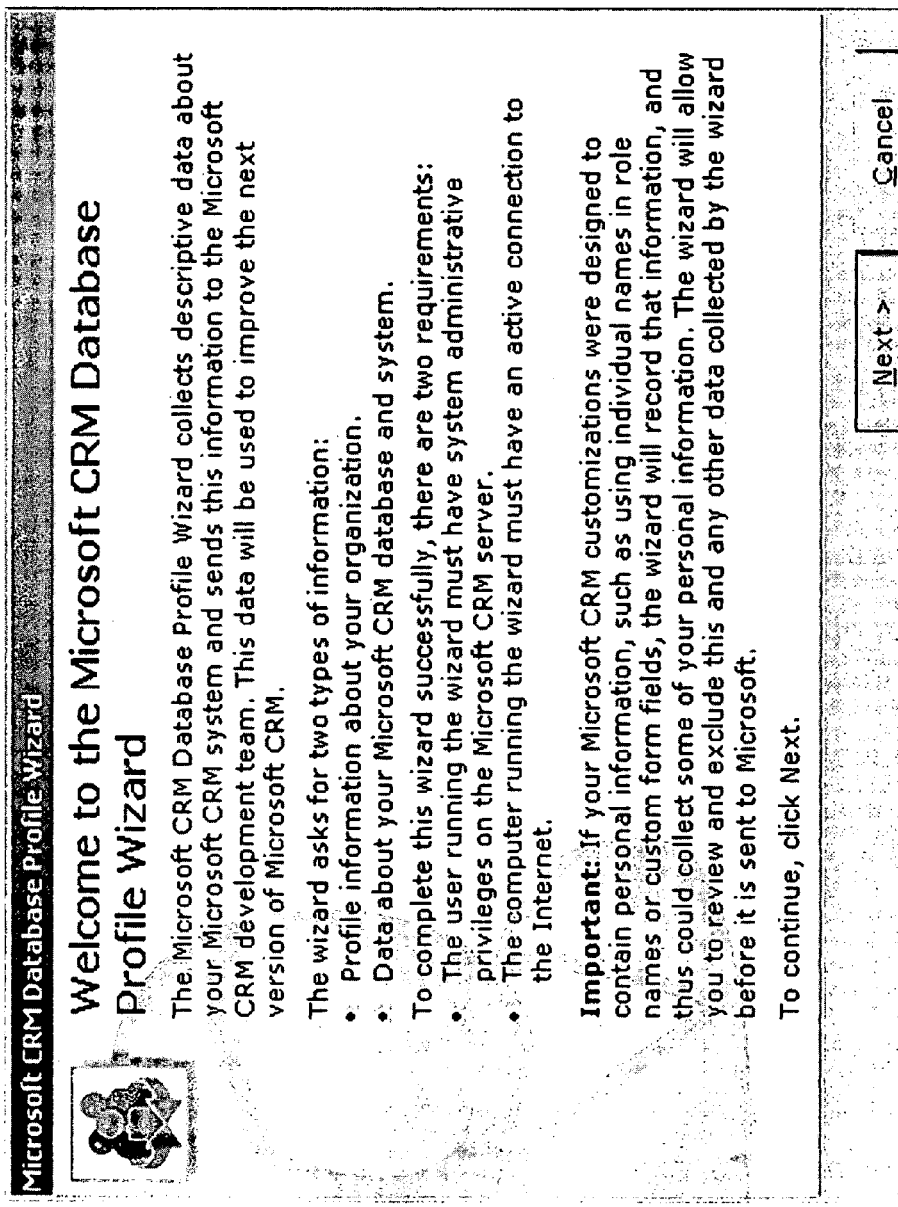
FIG. 6 is an example of a possible welcome screen in accordance with the claims.

FIGS. 3a and 3b may be more detailed flowcharts of one embodiment of the method. At block 300, assuming the necessary software has already been communicated to the system in question, the method may begin when an executable program with the step of the method may be selected. At block 302, a welcome screen may be displayed where a selection may be made to proceed to the next step such as step 304 or to cancel. FIG. 6 may be an example of a possible welcome screen. Options may be presented to proceed to a next screen 605 or to cancel 610. On clicking "Cancel" button, system may prompt for a confirmation message saying "Do you really want to quit?" with "Yes/No buttons" being available for selection. On clicking "Yes," the system may release all the resources and close the application. On clicking "No," the system may continue with the current screen.

Figure 7:
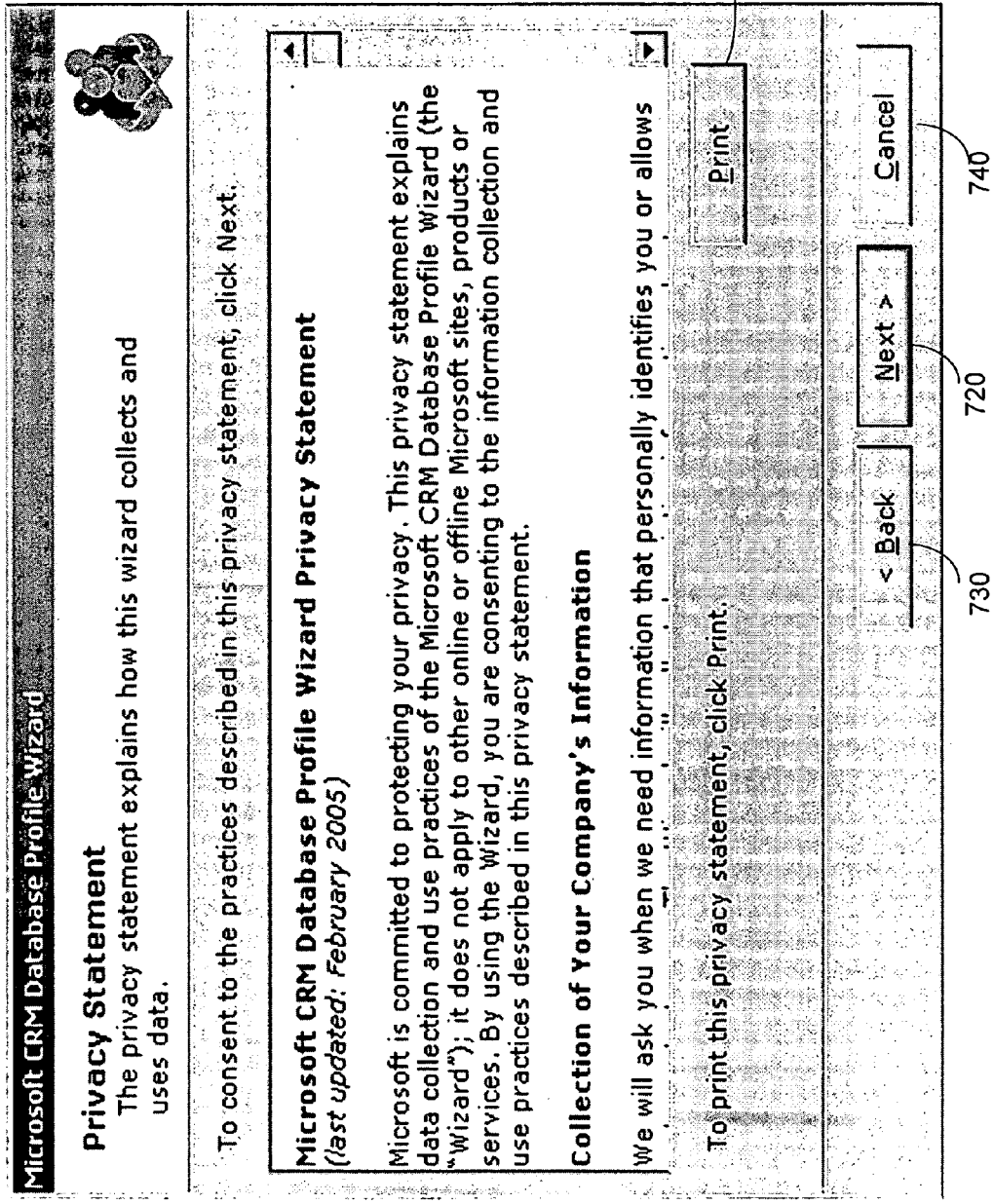
FIG. 7 is one possible privacy statement in accordance with the claims.

Referring again to FIG. 3a, at block 304, a customer privacy statement may be displayed. CRM users may be concerned that the information to be communicated could be used in a manner that would be a competitive disadvantage. The privacy statement may describe the privacy steps to be used with the data. FIG. 7 may be one example of such a display. After the data is displayed, options may be presented to print the privacy statement 710, move on to the next screen 720, go back to the previous screen 730 or canceling the method 740. On clicking "Cancel" button, system may prompt for a confirmation message saying "Do you really want to quit?" with "Yes/No buttons" being available for selection. On clicking "Yes," the system may release all the resources and close the application. On clicking "No," the system may continue with the current screen. In addition, the privacy display may be accessed in future displays such as in FIGS. 8-23 by selecting a "privacy policy" tab where the privacy policy will be displayed again.

Figure 8:
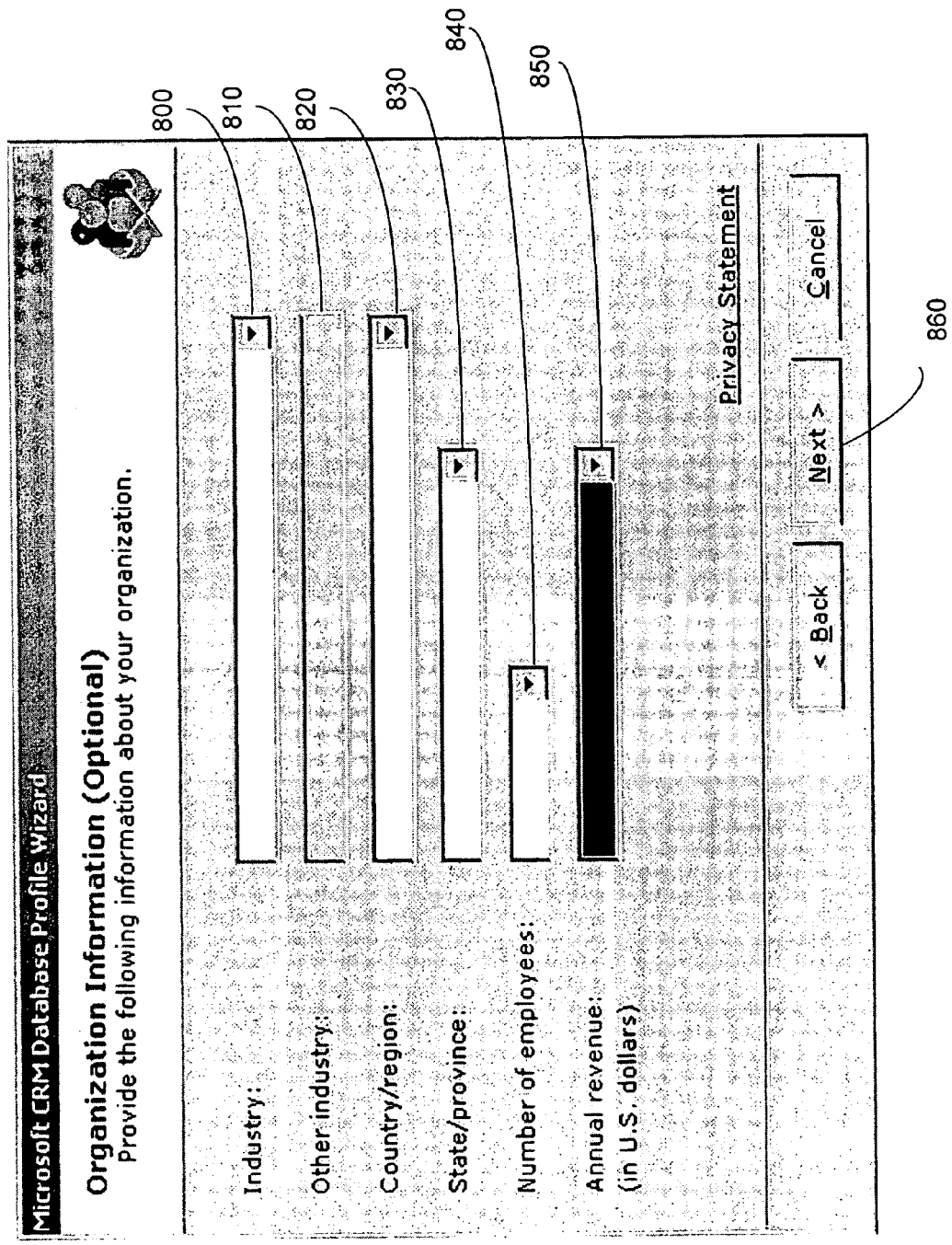
FIG. 8 is an organizational information gathering display in accordance with the claims.

Referring again to FIG. 3a, assuming next is selected at block 304, at block 306, the method may begin to ask for organizational information. The method may also ask for industry related data. FIG. 8 may be a sample display which may take the inputs from the user like industry 800, other related industries 810, country 820, state or province 830, number of employees 840 and annual revenue 850. Business information about a customer may give important context to the data the wizard collects about the database. Reports on the collected data may be built to pivot on this business data, such as "Data Quantity by Industry", which gives the CRM product team information on how customers needs vary across business categories. On selecting the Next button 860, the entered data may be stored for future reference.

Figure 9:
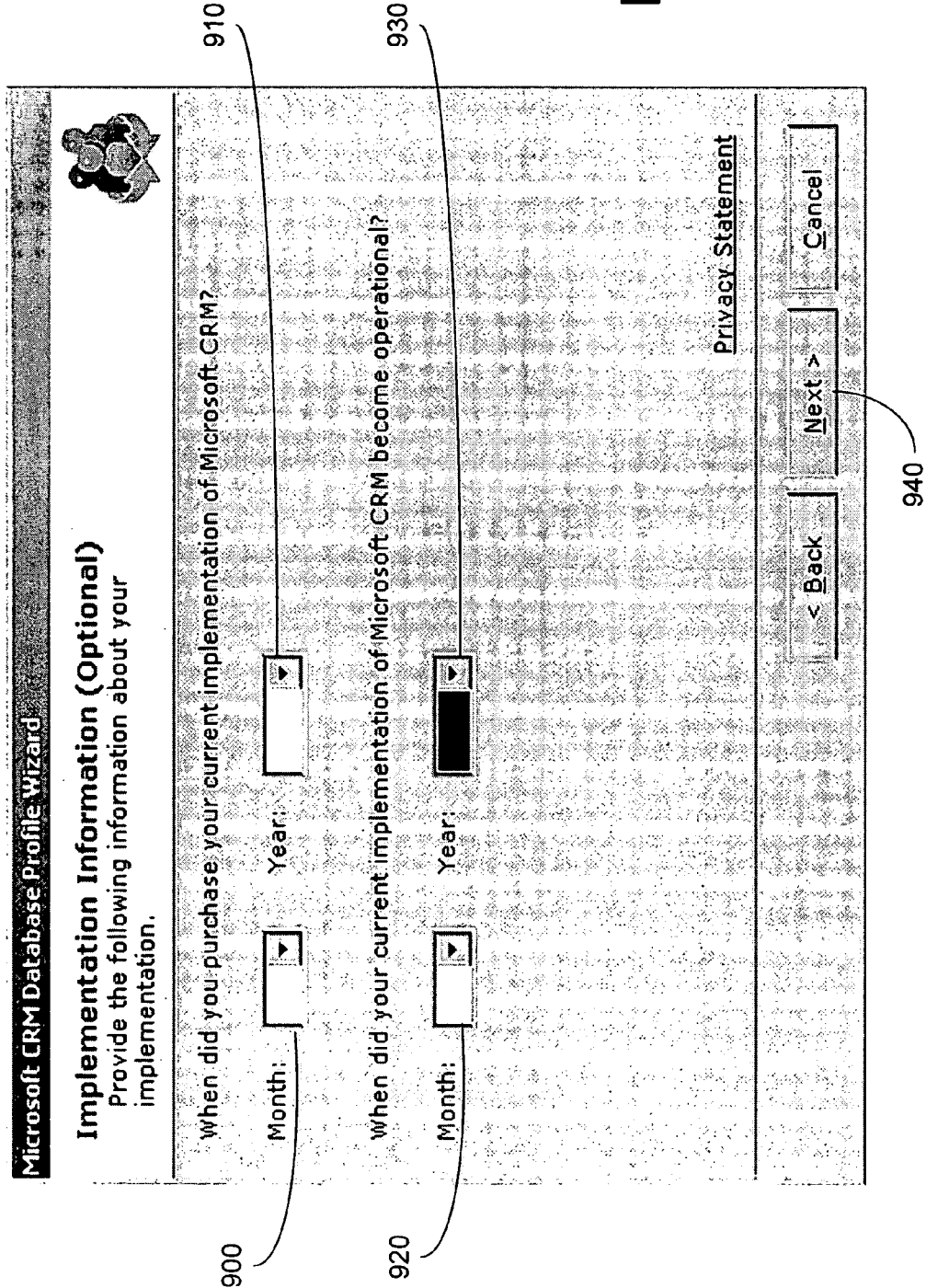
FIG. 9 is an implementation information display in accordance with the claims.

At block 308 (FIG. 3a), a CRM implementation information screen may be displayed. FIG. 9 may be an example of one such display. The display may take the inputs about the purchase month 900 and year 910 and implementation month 920 and year 930. On selecting the Next button 940, the entered data may be stored for future references.

Figure 10:
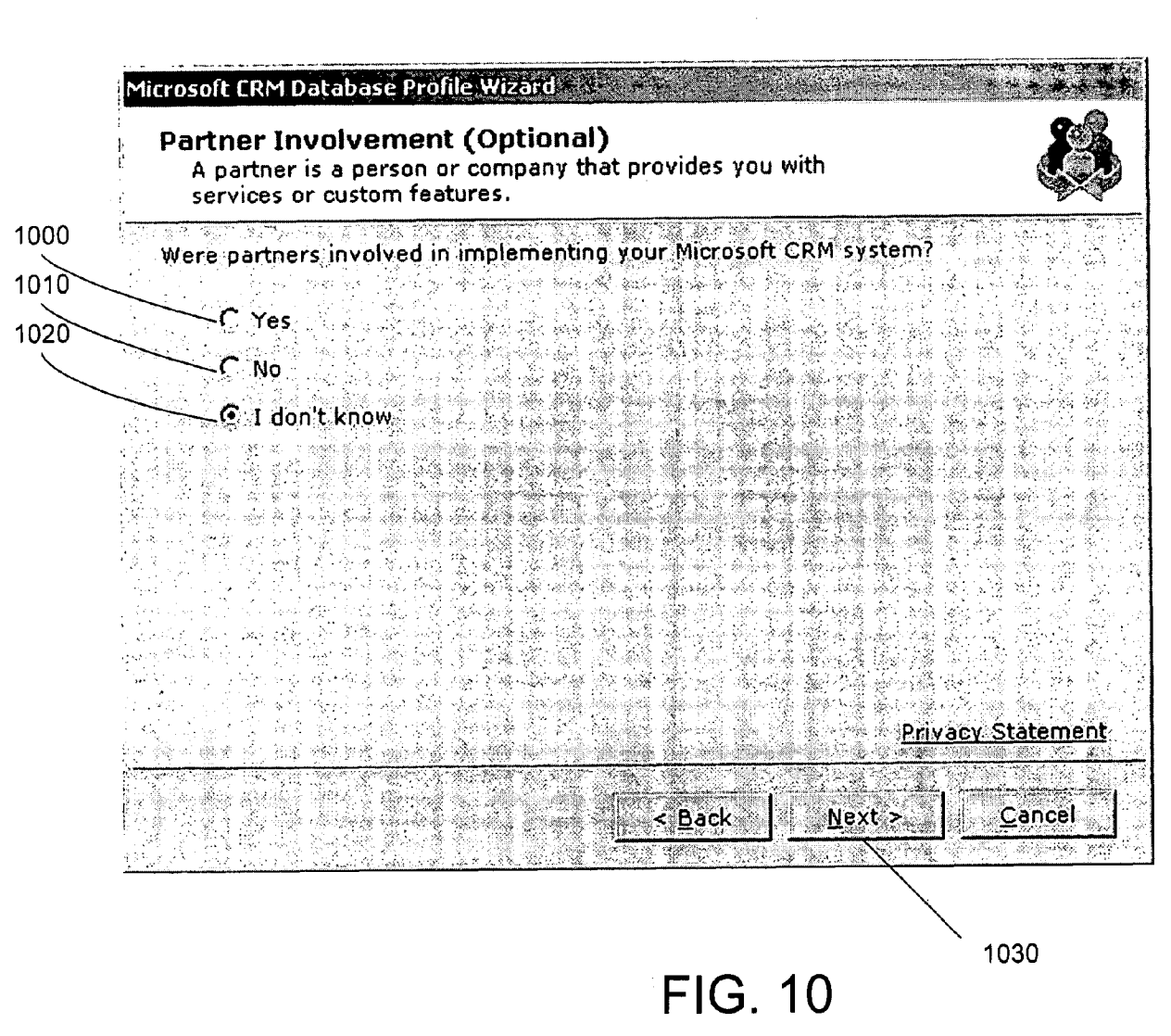

At block 310 (FIG. 3a), the method may inquire about whether partners are involved in providing services or value added features. FIG. 10 may be an example of one such display. Selections may include yes 1000, no 1010 or not sure 1020. On selecting next 1030, the entered data may be stored for future use.

At block 312 (FIG. 3a), the method may evaluate whether it was indicated partners where involved at block 310. If it was indicated that partners are involved, control may pass to block 314 where additional information may be gather about the partner. If it was indicated that partners were not involved or not sure, control may pass to block 316 where questions about add-ons to the CRM system may be posed.

Figure 11:
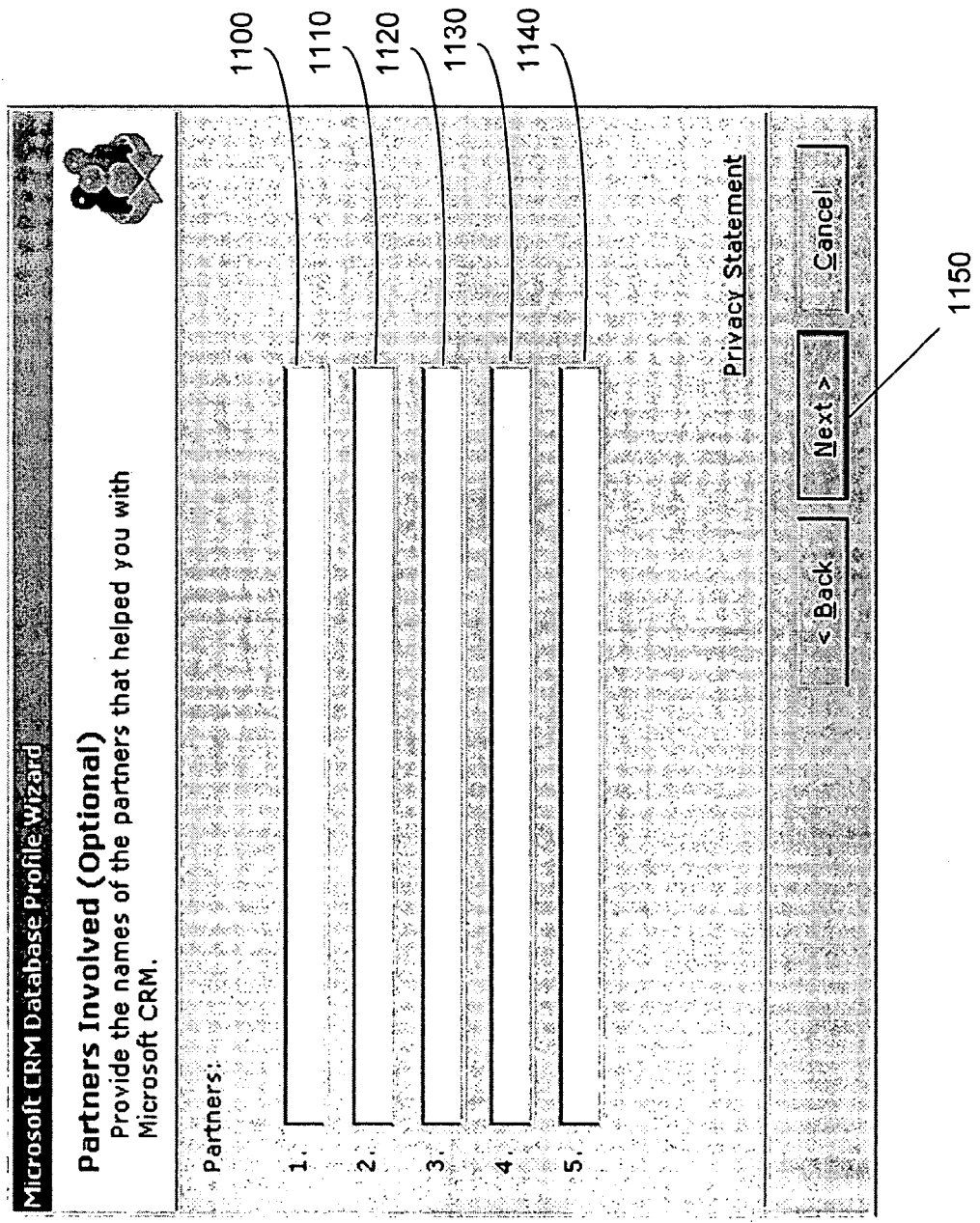
FIG. 11 is a partner information gathering display in accordance with the claims.

At block 314 (FIG. 3a), the method may inquire about partners names who are involved in providing services or value added features. FIG. 11 may be an example of such a display. The display may take the information about the partners' names 1100-1140 that are involved in providing services or value added features. On selecting the next button 1150, the entered data may be stored for future use.

Figure 12:
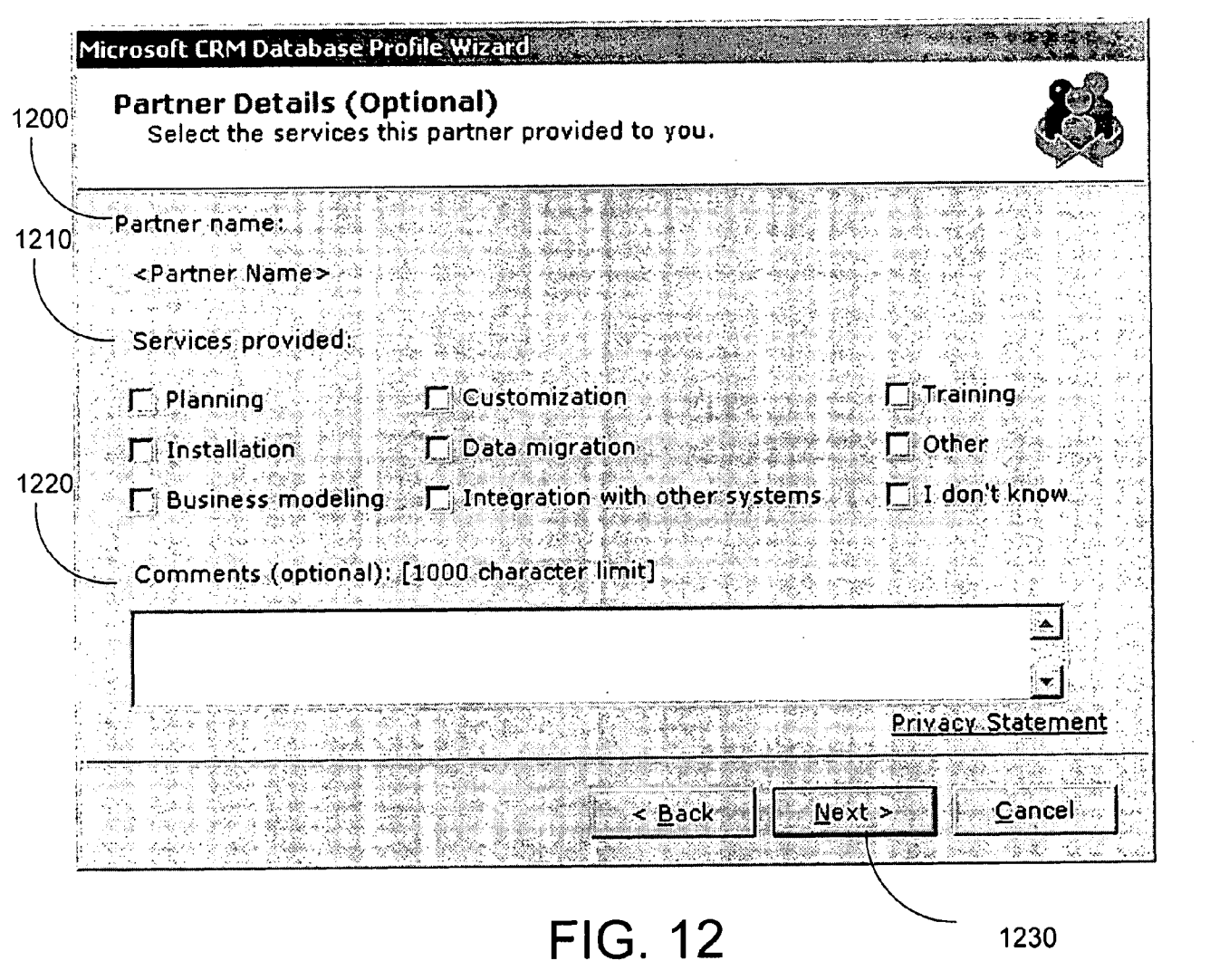

In addition, a partner details display may be displayed for each partner entered in inputs 1100-1140. FIG. 12 may be an example of one such display. The partner name from blocks 1100-1140 may be displayed 1200 and various blocks may be displayed to indicate the type of services the add-on provider is delivering 1210. The method may also accept comments about the add-on provider 1220. Upon selecting a next button 1230, the data may be stored for future use. If details for all the add-on providers from blocks 1100-1140 have been entered, the method may pass control to block 316.

Figure 13:
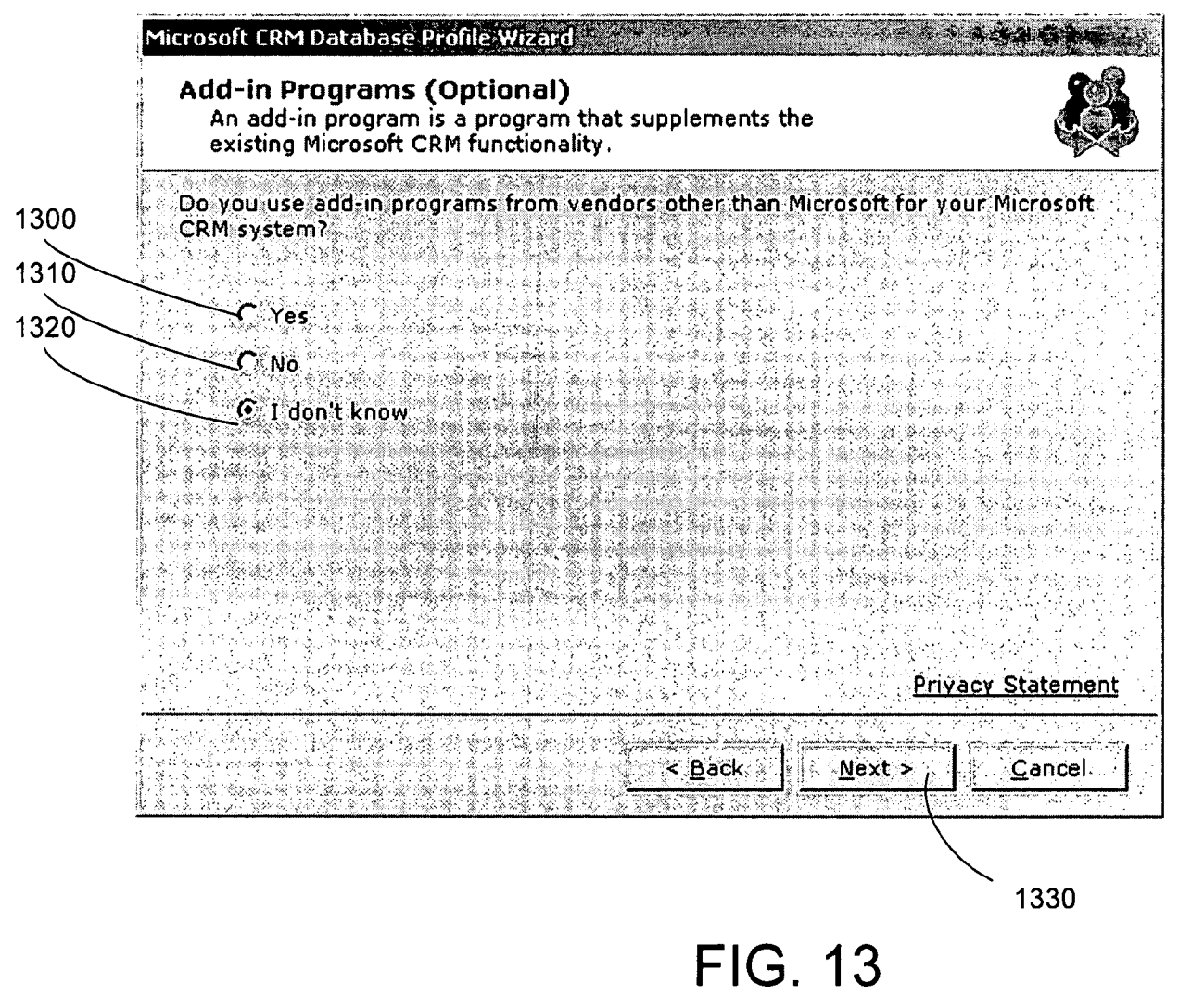

At block 316 (FIG. 3), the method may ask if add-in software is included in the CRM system. FIG. 13 may be a sample display of where options to be selected about add-in programs include yes 1300, no 1310 or do not know 1320. Upon selecting a next button 1330, the selections may be saved for future use.

Figure 14:
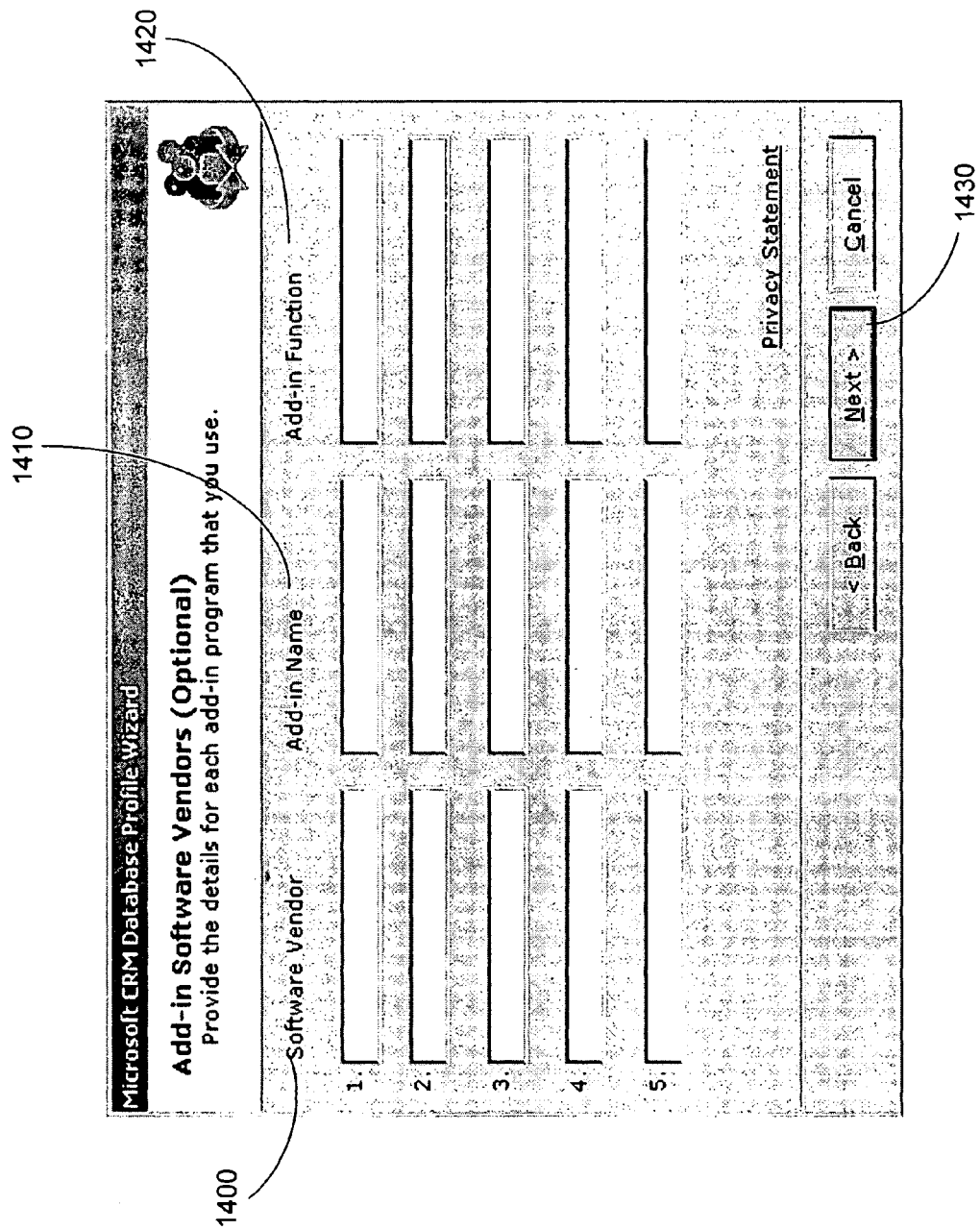
FIG. 14 is a detailed add-in program gathering display in accordance with the claims.
Figure 15:
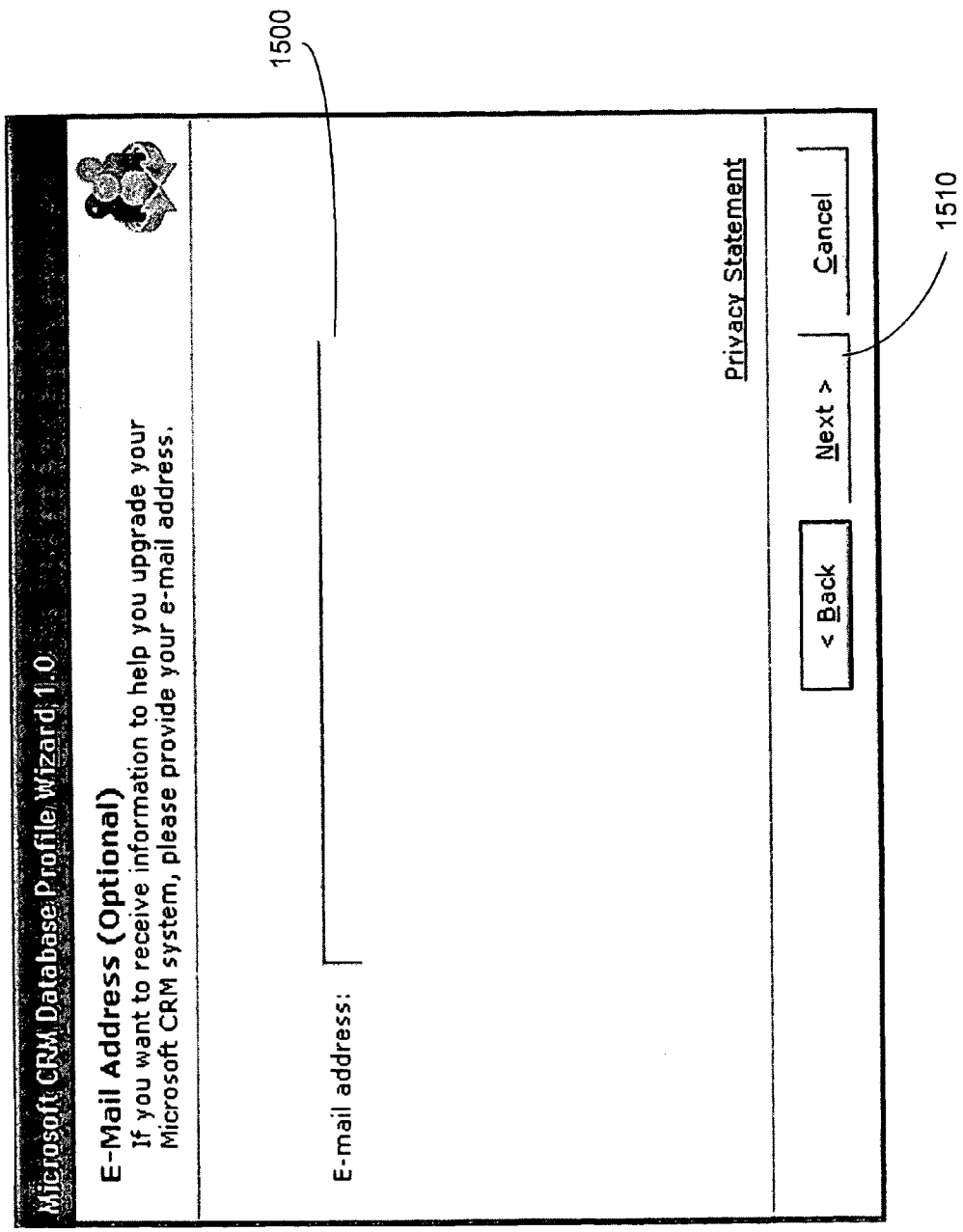
FIG. 15 is an email gathering display in accordance with the claims.

At block 318 (FIG. 3a) the method may make a determination of whether add-in programs are part of the CRM service based on the inputs from block 316. Customizations that customers make to their database may have significant downstream impacts such as loss of upgrade support. If yes was selected at block 316, control may pass to block 320 where additional detail may be added about the add-in programs. FIG. 14 may be a sample display where additional information about add-in programs is gathered such as details about the Vendor Name 1400, Add On Name 1410 and Add On Functionalities 1420. By selecting next 1430, the data entered may be saved for future use. If at block 316 (FIG. 3) no or do not know was selected, control may pass to block 322. At block 322, an email address may be added. FIG. 15 may be a sample display of an email input screen. An email address may be added in the input box 1500 and the email address may be stored for future use when a next button 1510 is selected.

Figure 16:
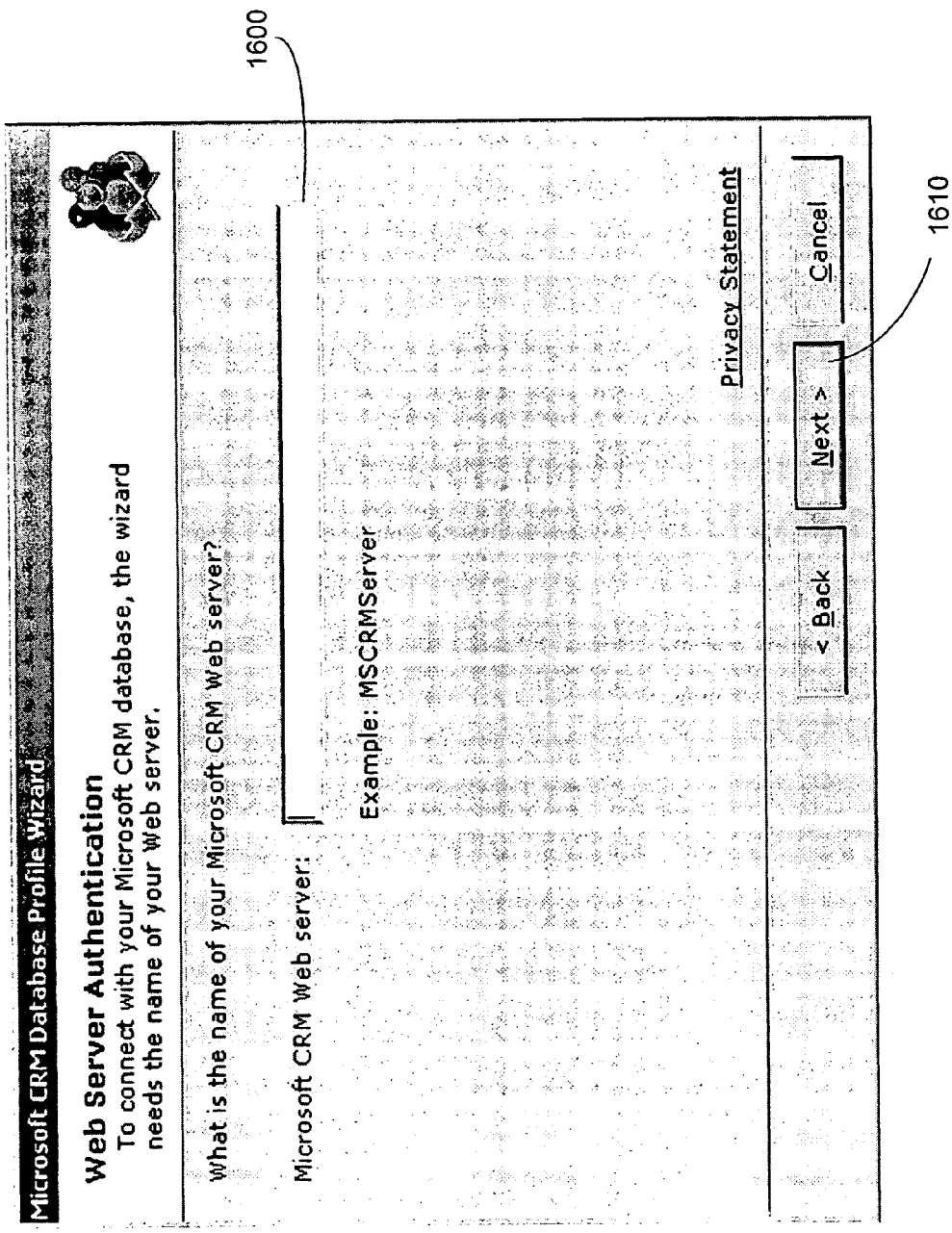
FIG. 16 is a CRM web server authentication display in accordance with the claims.

At block 324 (FIG. 3a), for verification and access purposes, the CRM server name may be added. FIG. 16 may be a sample display where the CRM server name is inputted. The CRM server name may be added at block 1600 and the enter name may be stored for future use when a next button 1610 is selected. At block 326 (FIG. 3), the method may determine whether the web server entered is a valid web server. The system may connect to the CRM Web Server and read appropriate registry entries to obtain the connection string to CRM DB Server. The system may use this connection string to make an attempt to connect to the CRM Database Server to verify the access and that the CRM server is valid. If the connection is not successful, control may pass to block 324 where the method may again request the name of the CRM server. If the connection is successful, control may pass to block 327.

At block 327 (FIG. 3a), the method may take information about the business data which customer wants to share with the CRM vendor. FIG. 17 may be a sample display where selections may be made about the data to be shared with the CRM vendor. The business data may be divided into following four categories 1. Object Number 1700;
2. Business Profile Information 1710;
3. Object Associations 1720; and
4. Organizational Structure 1730.

By selecting next 1740, the data may be stored for future use.

Figure 18:
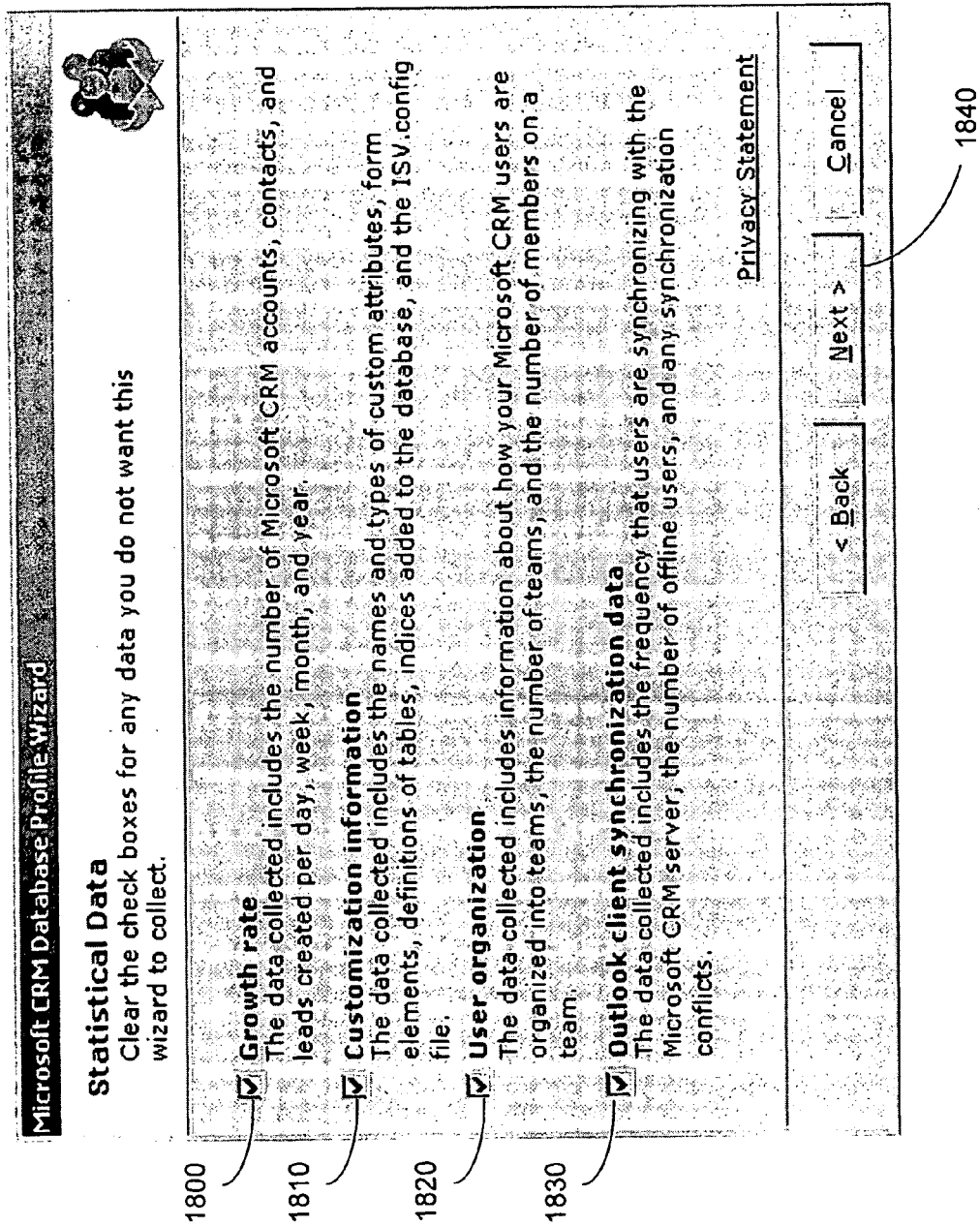
FIG. 18 is a statistical data authorization gathering display in accordance with the claims.

At block 328 (FIG. 3a), the method may inquire about the CRM statistical data which a customer wants to share with the CRM vendor. FIG. 18 may be a sample display of inquiring about such data. The CRM statistical data is divided into following four categories 1. Growth Rate 1800;
2. Customization Information 1810;
3. Collaboration 1820; and
4. Outlook Client Synchronization Data 1830.

In order to measure how customers are using different features of the CRM system in conjunction with each other, the method may calculate the number of associations between data records. For example, if an account is associated with one or more contacts, the unique ID of the contact record would be linked to the unique ID of the account in the database. The method may measure data growth rates by analyzing the creation dates of database records to derive how many records of a particular type were created within the last X days, for example. In addition, in order to understand what changes customers are making to the out-of-the-box database, the wizard may take a schema difference between the customer's database and the database that was shipped with the product. By selecting next 1840, the entered data may be stored for later use.

Figure 19:
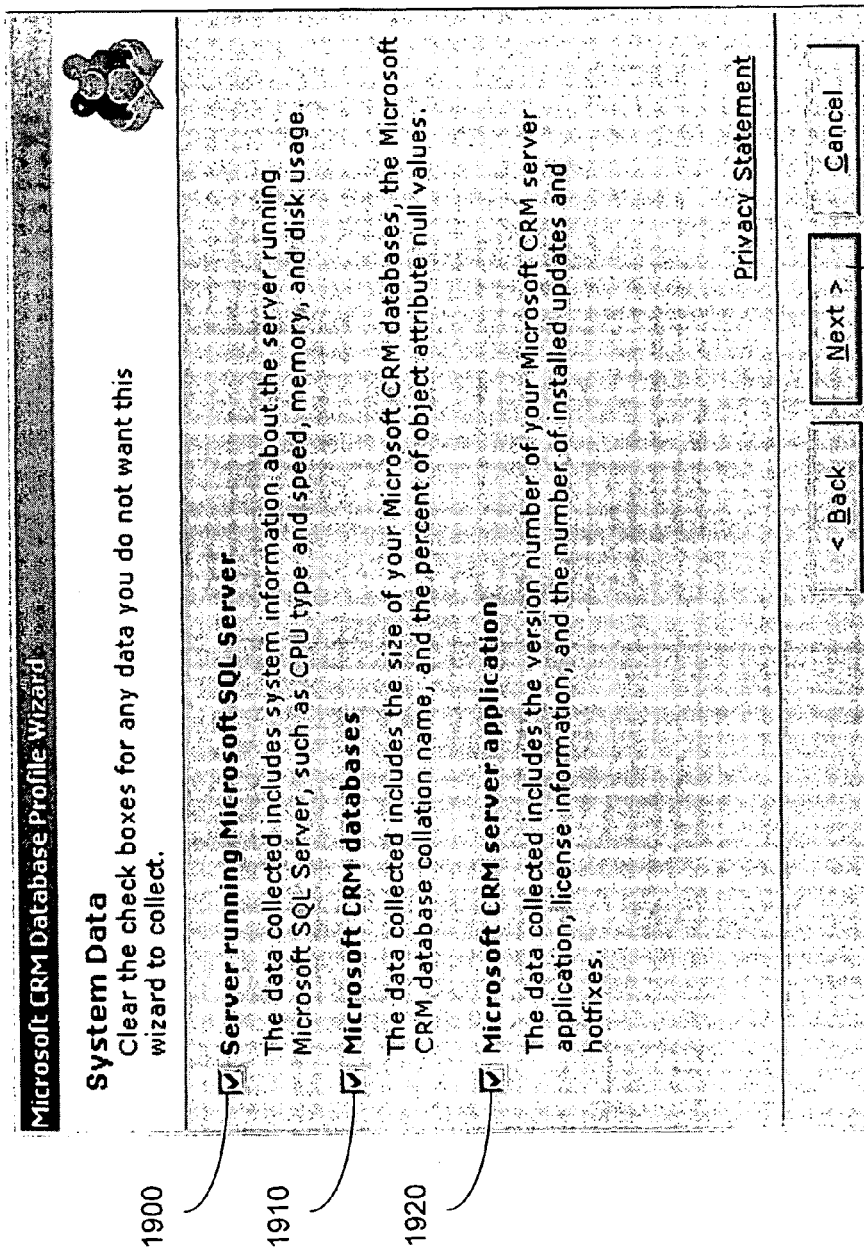
FIG. 19 is a system information authorization gathering display in accordance with the claims.

At block 330 (FIG. 3*a*), the method may take information about the CRM System data which customer wants to share with the Microsoft. FIG. 19 may be an illustration of a sample display for collecting CRM system data. The CRM System data is divided into following three categories 1. SQL Server Information 1900;
2. Microsoft Database Server Information 1910; and
3. Microsoft CRM Server Application 1920.

To measure how much data a customer has, the method may count the number of rows in database tables used by certain features of the CRM application. For example, by counting the number of rows in the Accounts table, the method may be able to compute the total number of accounts in the system. The method may also take another measure of data quantity by recording the physical size of the database.

The customer's hardware information may be gathered by retrieving the system information of servers such as CPU speed, CPU type, RAM size, and hard drive size. These hardware details give the product team a real-world picture of the hardware requirements of the CRM application. Along with the other profile characteristics such as data quantity and growth rates, the product team may be able to better understand the hardware needs of various kinds of customers. By selecting next 1930, the entered data may be stored for later use.

Figure 20:
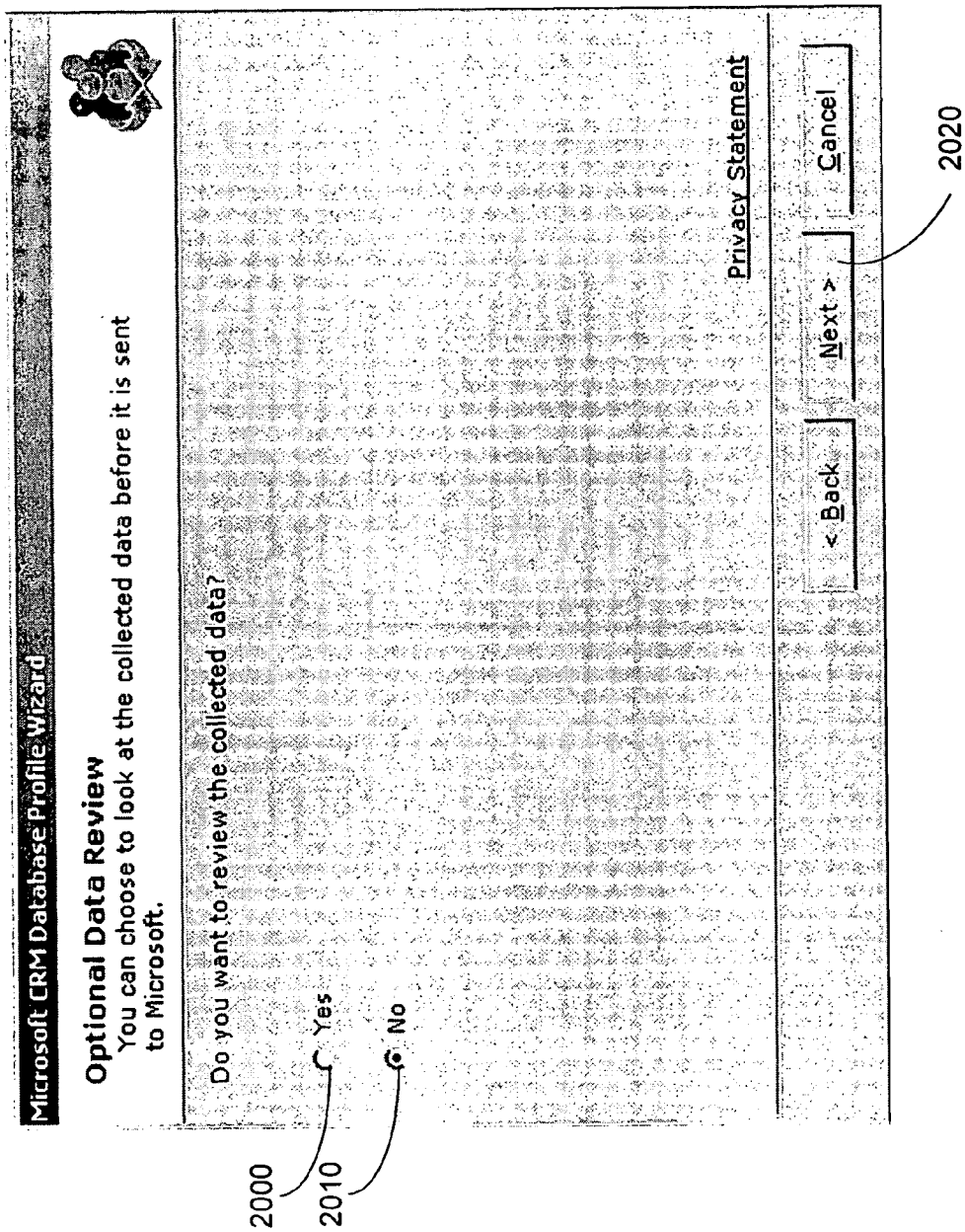
FIG. 20 is a selection display to view data before it is communicated in accordance with the claims.
Figure 21:
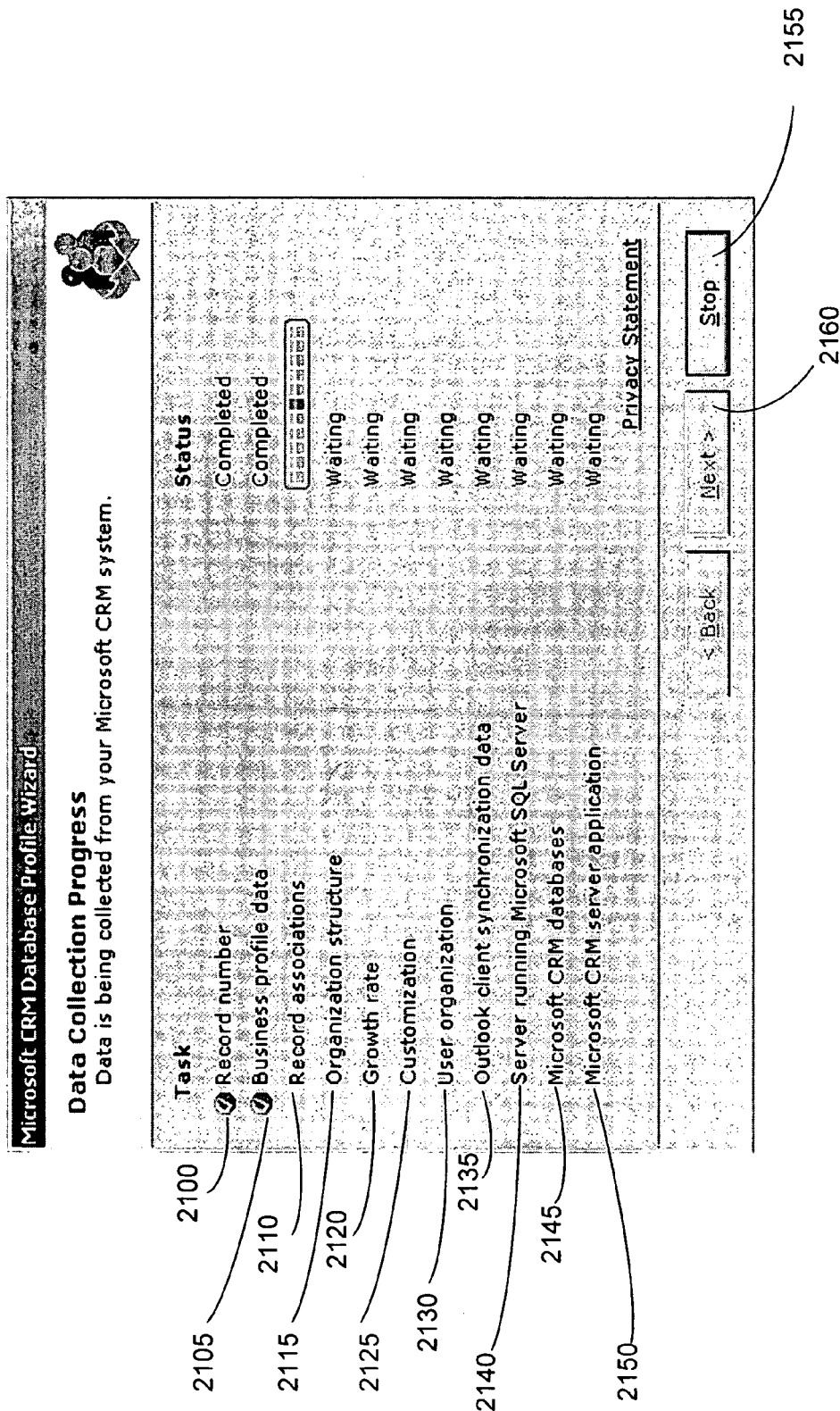
FIG. 21 is a data collection progress display in accordance with the claims.
Figure 22:
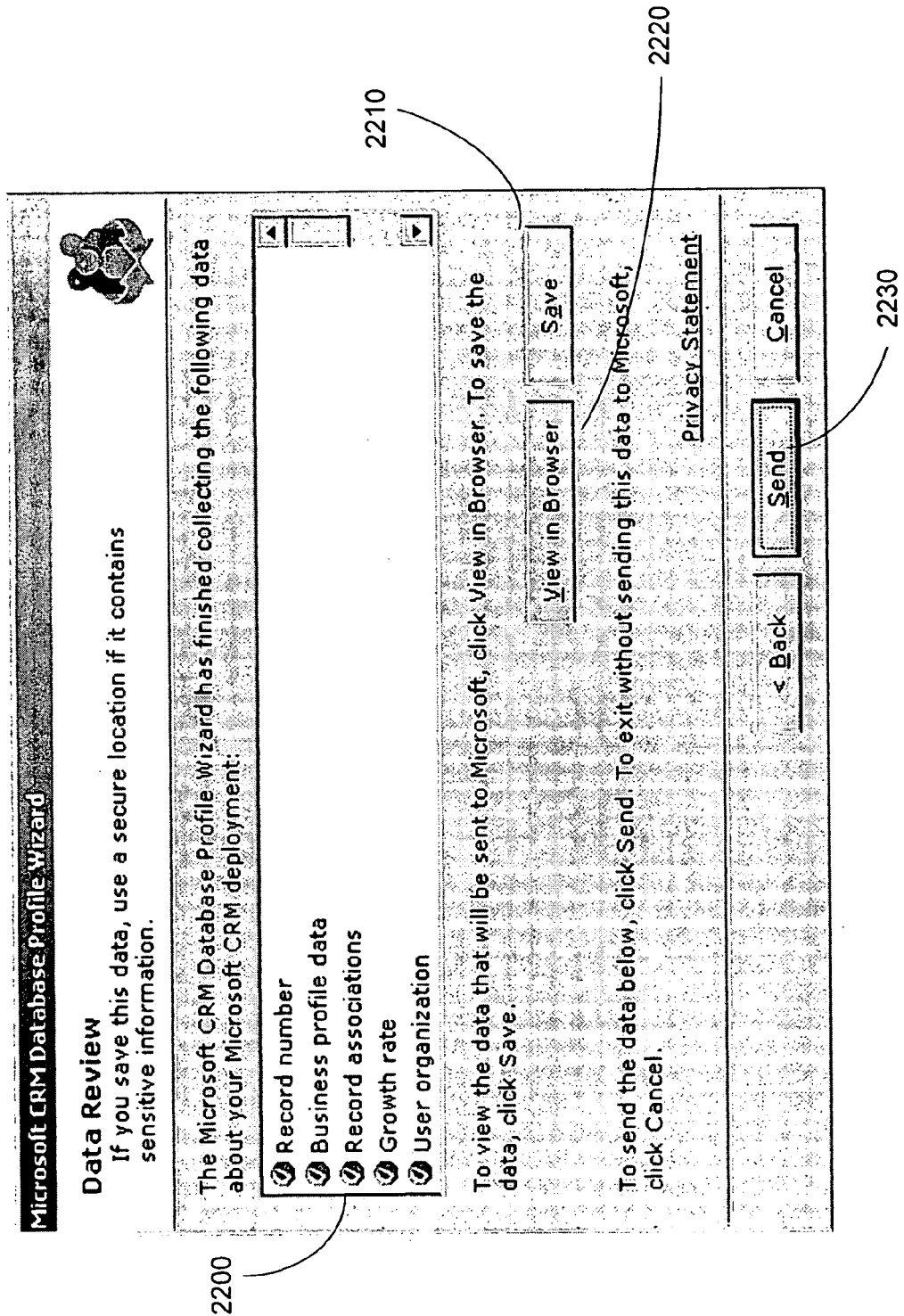
FIG. 22 is a data review before communication option in accordance with the claims.

At block 332 (FIG. 3*a*), options may be presented to allow the selection to review specific portions of the collected data before it is communicated. FIG. 20 may be a sample illustration of a display to give the option of selecting yes 2000 or no 2010 to inspect the data before it is sent to the CRM vendor. By selecting next 2020, the method may save the selection for future use.

At block 334 (FIG. 3*b*), the method may determine whether at block 332 a selection was made to inspect the data to be communicated. If the determination is no, control may pass to block 336 where a data collection display may be displayed. A sample data collection display may be illustrated in FIG. 21 where the screen may show the section wise 2100-2150 progress of the data collection. The section for which the data will be collected 2100-2150 may be marked as '√' and completed and progress bar will move to the next section.

If the determination at block 334 is yes (inspect the data to be sent), control may pass to block 338. At block 338, a data collection display may be displayed. A sample data collection display may be illustrated in FIG. 21 where the screen may show the section wise 2100-2150 progress of the data collection. The section for which the data will be collected 2100-2150 may be marked as '√' and completed and progress bar will move to the next section. A stop 2155 selection may pass control to block 340 or the method may return to block 332. A next 2160 selection may save the entered data for future use.

At block 340, the collected data from the CRM database may be displayed. A sample illustration of such a display may be in FIG. 22 where a selection may be made to review the various collected data 2200. The options of saving the data 2210 or to view the data in a browser 2220 may be presented. This screen may only appear if a selection has been made to inspect data in the "inspection screen" (FIG. 20) or if a selection has been made to stop 2155 (FIG. 21) in the data collection screen.

Figure 23:
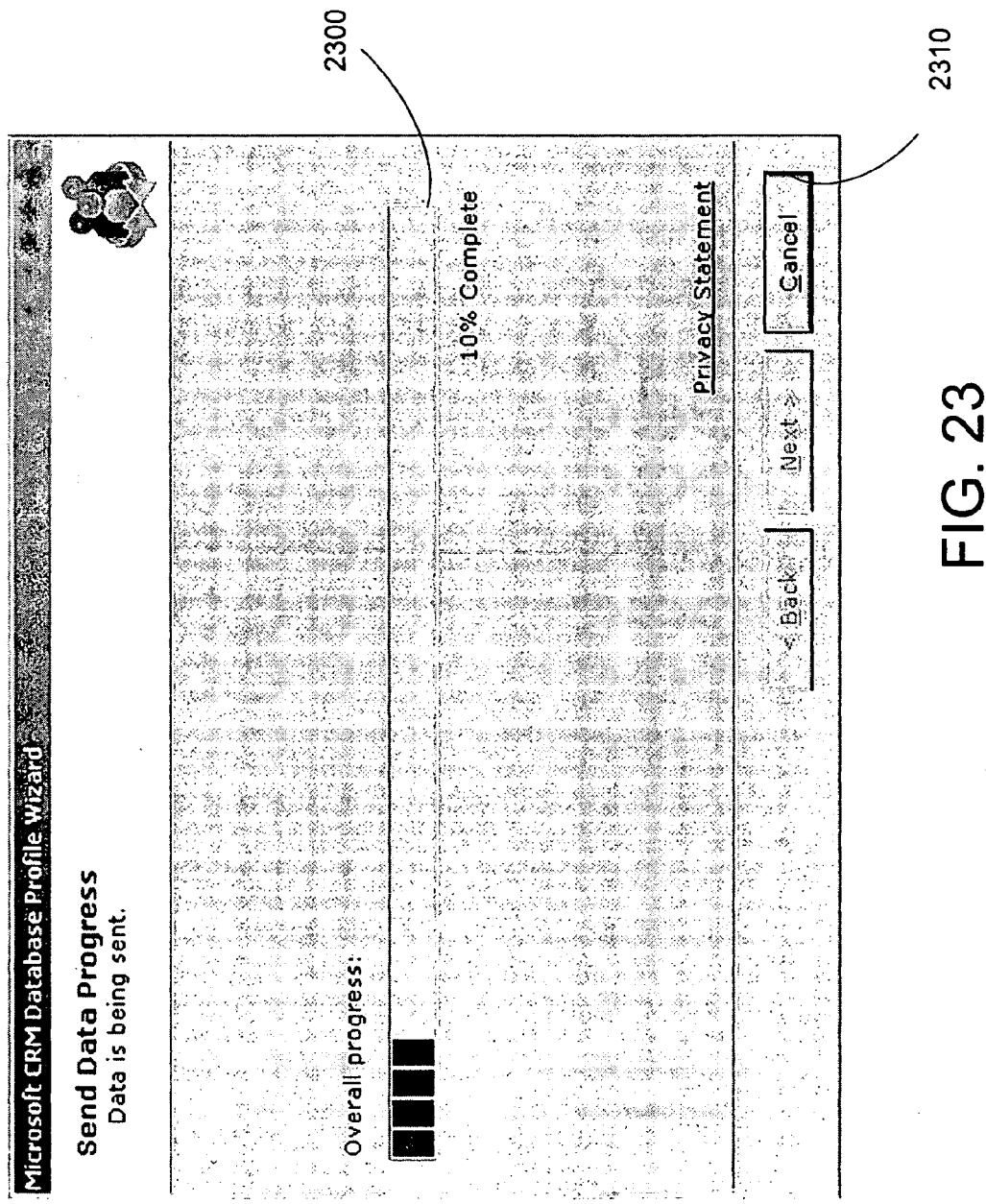
FIG. 23 is a sent data progress display in accordance with the claims.

At block 342 (FIG. 3*b*), the method may display the progress of the communication of the data to the CRM vendor. FIG. 23 may be an illustration of a data progress display. The display may show the progress bar 2300 which gives the status (in %) about the data already sent. A cancel button 2310 may stop the communication and control may pass to block 346 (FIG. 3*b*).

Figure 24:
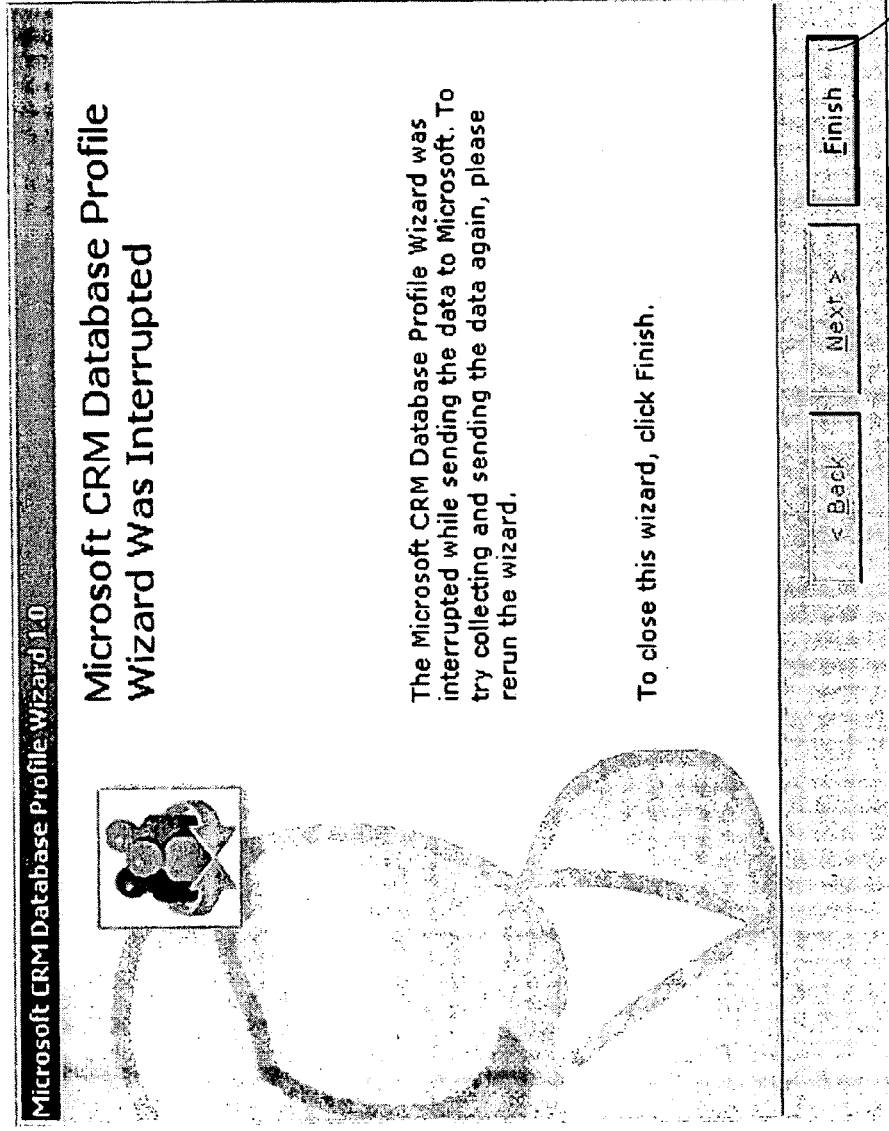
FIG. 24 is a communication disruption display in accordance with the claims.
Figure 25:
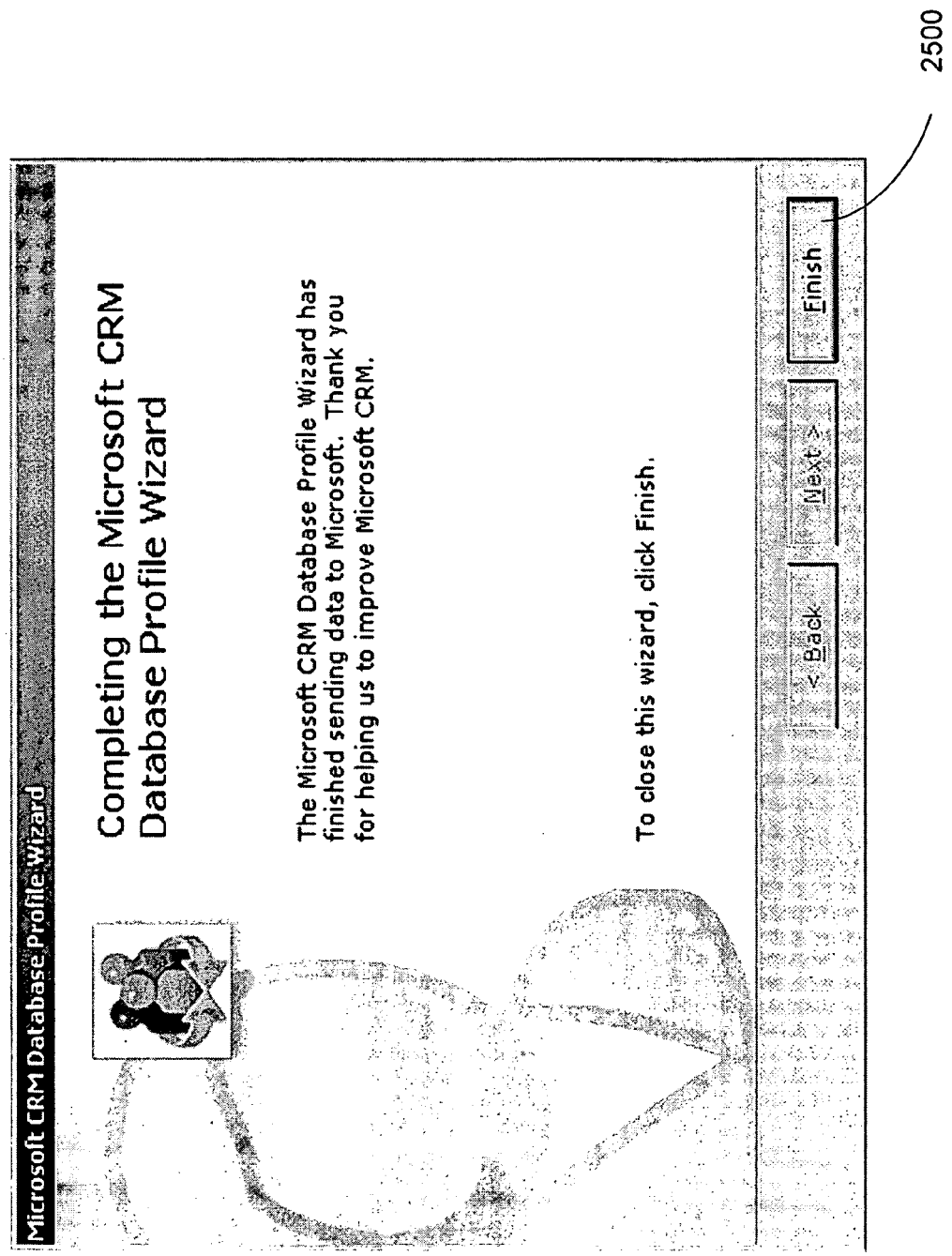
FIG. 25 is a communication completion display in accordance with the claims.

At block 344, the method may determine whether the communication to the CRM vendor was successful. If the communication was not successful, such as when communication was canceled by using the cancel button 2310, a failure display may be displayed such as illustrated in FIG. 24. The method may be closed by selecting finish 2400. If the determination at block 344 was that the communication was successful, at block 348, a success display may be shown such as illustrated in FIG. 25. The method may be closed by selecting finished 2500.

Figure 4:
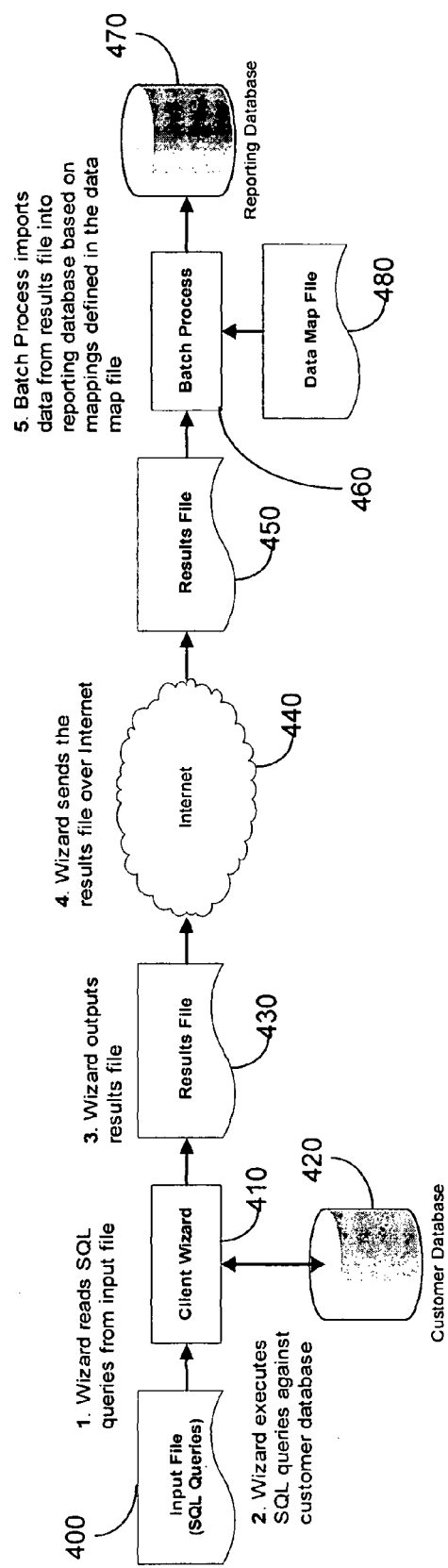
FIG. 4 is another high level illustration of the method, focusing more on the end use of the data at the CRM vendor in accordance with the claims.

FIG. 4 may be another high level illustration of the method, focusing more on the end use of the data at the CRM vendor. As previously explained in relation to FIGS. 2 and 3, the method uses SQL queries 400 read in from an input file and execute the SQL statements 410 against the customer database 420. As most of the data is collected through SQL query statements, the method may be customized to collect any data about any database as long as the data can be expressed in SQL. For example, to count the number of records in a different database or table, the method may simply replace the database and table names in the SQL query. To compute descriptive statistics such as average, min, and max, the method may modify the SQL statement. All the SQL queries that the wizard executes can be placed in an XML input file.

After the data is collected into a results file 430 and sent across the internet 440 to a file store 450, a process such as a batch process 460 may import the results file 450 into the reporting database 470 by reading a data map file 480 which defines what data goes into which column of which table. The data map 480 file must be defined according to the data that is collected as specified in the input file 400. After the data is imported into the reporting database 470, the CRM vendor may design reports or queries to analyze the data in the database 470.

Figure 5:
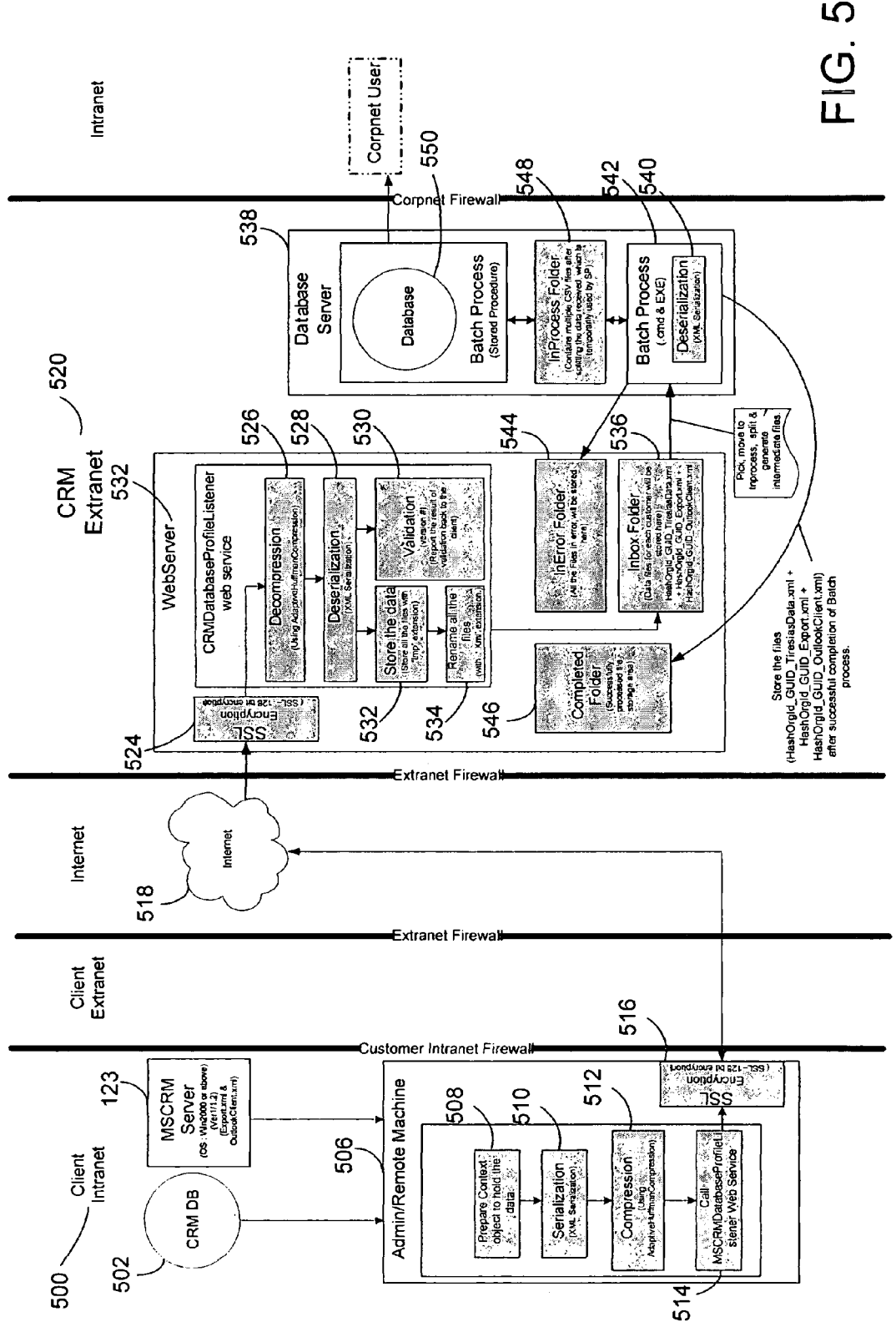
FIG. 5 is an illustration of the blocks that represent the steps of the method in accordance with the claims.

FIG. 5 may be an illustration of the blocks that represent the steps of the method. On the customer side on a customer internet 500, there may be a CRM database 502 and a CRM server 504. The CRM database 502 and CRM server 504 may be in communication with a remote computing device 506. The remote device 506 may have software, hardware or a combination of hardware and software programmed perform the steps of the method. A block 508 may perform the step of creating an object to hold the data to be communicate to the CRM vendor. The object may be designed a parent class that is used as a wrapper to all of the following sub-classes, which are responsible to hold the data in their variables. The parent class may contain the objects of each sub classes defined as public, so that it may be visible to the other parts of the application. The following are brief description of sub classes used in this wrapper class:

CRMDBProperties Class

This class may hold the data related to the "CRMDBProperties" table. All the variables defined in it are public, which may be used to store the data in the objects.

Partners Class

This class may hold the data related to the "Partners" table. All the variables defined in it are public, which may be used to store the data in the objects.

BusinessUnitNames Class

This class may hold the data related to the "BusinessUnitNames" table. All the variables defined in it are public, which may be used to store the data in the objects.

CRMSystemCharacteristics Class

This class may hold the data related to the "CRMSystemCharacteristics" table. All the variables defined in it are public, which may be used to store the data in the objects.

CRMSystemInfo Class

This class may hold the data related to the "CRMSystemInfo" table. All the variables defined in it are public, which may be used to store the data in the objects.

CRMUsageGrowth Class

This class may hold the data related to the "CRMUsageGrowth" table. All the variables defined in it are public, which may be used to store the data in the objects.

AddOns Class

This class may hold the data related to the "AddOns" table. All the variables defined in it are public, which may be used to store the data in the objects.

CollabRulesPerObj Class

This class may hold the data related to the "CollabRulesPerObj" table. All the variables defined in it are public, which may be used to store the data in the objects.

Collaboration Class

This class may be used to hold the data related to the "Collaboration" table. All the variables defined in it are public, which may be used to store the data in the objects.

CustomFormElement Class

This class may hold the data related to the "CustomFormElement" table. All the variables defined in it are public, which may be used to store the data in the objects.

CustomFormItems Class

This class may hold the data related to the "CustomFormItems" table. All the variables defined in it are public, which may be used to store the data in the objects.

CustomFormMaster Class

This class may hold the data related to the "CustomFormMaster" table. All the variables defined in it are public, which may be used to store the data in the objects.

CustomNonstandard Class

This class may hold the data related to the "CustomNonstandard" table. All the variables defined in it are public, which may be used to store the data in the objects.

DataCollectionMaster Class

This class may hold the data related to the "DataCollectionMaster" table. All the variables defined in it are public, which may be used to store the data in the objects.

FormFielsRemoved Class

This class may hold the data related to the "FormFielsRemoved" table. All the variables defined in it are public, which may be used to store the data in the objects.

ObjectAssociation Class

This class may hold the data related to the "ObjectAssociation" table. All the variables defined in it are public, which may be used to store the data in the objects.

ObjectCount Class

This class may hold the data related to the "ObjectCount" table. All the variables defined in it are public, which may be used to store the data in the objects.

ObjectStructDataType Class

This class may hold the data related to the "ObjectStructDataType" table. All the variables defined in it are public, which may be used to store the data in the objects.

OrgStructSecPrev Class

This class may hold the data related to the "OrgStructSecPrev" table. All the variables defined in it are public, which may be used to store the data in the objects.

SalesTransDistribution Class

This class may hold the data related to the "SalesTransDistribution" table. All the variables defined in it are public, which may be used to store the data in the objects.

SyncSample Class

This class may hold the data related to the "SyncSample" table. All the variables defined in it are public, which may be used to store the data in the objects.

SyncUser Class

This class may hold the data related to the "SyncUser" table. All the variables defined in it are public, which may be used to store the data in the objects.

UserRolesWithQuotas Class

This class may hold the data related to the "UserRolesWithQuotas" table. All the variables defined in it are public, which may be used to store the data in the objects.

ObjectTypeLineItems

This class may hold the data related to the "ObjectTypeLineItems" table. All the variables defined in it are public, which may be used to store the data in the objects.

CollabPeoplePerObj

This class may hold the data related to the "CollabPeoplePerObj" table. All the variables defined in it are public, which may be used to store the data in the objects.

LoadSections Class

This class is responsible to upload the data to the objects of each business sub class's variables.

The data may then be serialized into an XML file using an XML serializer 510. Stored data may be saved in the form of XML files with the following naming convention;

"HashOrgId_GUID_CollectedData.xml"—May contains the actual data from CRM database.

"HashOrgId_GUID_Export.xml"—May contain few additional client specific information in XML format.

"HashOrgId_GUID_OutlookClient.xml"

The compression block 512 may compress the resulting file from block 510 using Adaptive Huffman Compression or other reliable, well known compression schemes to save bandwidth during communication. The call webservice block 514 may begin the communication process from the client to the CRM provider.

An encryption block 516 may encrypt the data in order to keep the communication of the data safe over the internet 518. This method may use "SSL 128 bit encryption" for transferring the data over the net to web server. For this, it will need to have "Certificate Authority" installed on web server machine. If anything goes wrong before receiving the data then it will be identified by web server and user at the client end will get the error message.

In addition, the method will implements "SHA1 algorithm" for hashing the Organization ID. It generates a unique hash key for unique string (organization ID) value. The generated key will be in Base-64 string format, which may be supported by SP scripts On the vendor side 520, a web server 522 may be used to listen for request send by the CRM clients using the method. The web server 522 may be a hosted a web service which exposes one method to listen for all the requests. Before processing the request it may check for the user's identity (Basic Authentication). After validating the credentials, it may extract the actual data. The task of web service includes the following steps:

1) Authentication;
2) Decryption;
3) Decompression;
4) Validation (version check, License Key, Organization Name check); and
5) File Storage.

Finally web service will put the data in the form of xml files in "FileShare" folder.

Authentication

The method may validate a CRM system based on the organization name, License GUID and the license key which may be passed to a method. If the authentication of OrganizationId, License GUID and License key fails, then the user will not be allowed to collect and send data.

Decryption 524

This tool 524 makes use of "Secured Socket Layer (SSL) 128 bit encryption & decryption" for transferring the data over the net to web server. For this, the CRM vendor may need to have "Certificate Authority" installed on web server machine. If anything goes wrong before receiving the data then it will be identified by web server and the user at client end will get the proper error message.

Decompression 526

This tool 526 may make use of the "AdaptiveHuffman-Compression" for the decompressing of the data which may have been compressed using Adaptive Huffman Compression to save bandwidth.

Deserialization 528

Using an XML deserializer 528, the decompressed data may be deserialized. The deserialized data may then be validates and stored.

Validation (version check) 530

Web service checks the version number of the method used by the client to send the data. If the client is not using the correct version it will return an error message to the user which will finally displayed and guide the user to install the new version of tool.

File Storage 532

Assuming validation is successful at block 530, the web service may store the data 532 in a safe storage area named as "File Share". The following method may be invoked by a web service to accomplish the task. A process such as a batch process may be used. There may be two parts of the process: an executable part and a stored procedures part. The executable is responsible to prepare a platform for stored procedures by completing all of the prerequisites and generating delimited temporary data files needed to upload the data. Stored procedures may be responsible for actual data uploading to the CRM vendor database.

The purpose of process may be to handle the information sent by customers and to upload data to the respective tables. Part of the process may entail renaming all the files 534. It may intake the group of files sent by the customers and processes it. During the processing, file may flow through the following four folders, Inbox 536

This folder 536 may be responsible for storing the data sent by the customer. Stored data will be saved in the form of XML files with the following naming convention;

"HashOrgId_GUID_CollectedData.xml"—May contains the actual data from CRM database.

"HashOrgId_GUID_Export.xml"—May contain few additional client specific information in XML format.

"HashOrgId_GUID_OutlookClient.xml"

This may be the input folder for stored procedures in the vendor database server 538. Whenever a process such as a batch job 540 gets invoked by batch environment, it may pick up the files from the "Inbox" 536, fills up all the required fields, generates delimited temporary data files for each stored procedure and stores them into "In Process" folder 542. Stored procedures may require the file path as an input for their reference to upload the data.

In Error 544

If any error occurs during the processing of data, the process such as a batch process may move the following three files (which consists a File Group) to this folder 544;

a. "HashOrgId_GUID_CollectedData.xml"—Contains the actual data from CRM database.

b. "HashOrgId_GUID_Export.xml"—Contains few additional client specific information in XML format.

c. "HashOrgId_GUID_OutlookClient.xml"

Completed 546

After a successful completion of the process, it may be the responsibility of the executable to move the following three files (which consists a File Group) to the "Completed" folder 546;

a. "HashOrgId_GUID_CollectedData.xml"—Contains the actual data from CRM database.

b. "HashOrgId_GUID_Export.xml"—Contains few additional client specific information in XML format.

c. "HashOrgId_GUID_OutlookClient.xml"

Stored procedures may be responsible for actually uploading the data to the software vendor database.

Executable

This part of the process may be a batch process 548 and may be responsible for setting up the platform for stored procedures which will upload the data to the database 550. It may intake the group of files sent by the customers and process the whole file group. During the processing file can flow through the following 4 folders, 1) Inbox 536.
2) In Process 542.
3) In Error 544.
4) Completed 546.

To complete its process, "Batch job" 548 may require the following classes,

1) DirectoryInspection Class
2) Customization Class
3) CSVGenerator Class
4) DataUploadBA Class
5) FileRedirection Class Stored procedures are being used to upload the data to the database 550. An executable file may be responsible to make calls to all of the stored procedures. There are three stored procedures defined to deal with 24 temporary data files which eventually will update 26 tables in database 550.

The following may be a list of the stored procedures 548 being used,
1) TiresiasUploadData
2) TiresiasDeleteData
3) TiresiasBulkInsertData The following 26 tables may be affected from the stored procedures 548;
1) AddOns
2) CRMDBProperties
3) Partners
4) CRMUsageGrowth
5) SyncUser
6) ObjectAssociation
7) SyncSample
8) CRMSystemInfo
9) OrgStructDataType
10) Collaboration
11) SalesTransDistribution
12) OrgStructSecPrev
13) ObjectCount
14) DataCollectionMaster
15) CollabRulesPerObj
16) CustomFormMaster
17) Customformelement
18) CustomNonstandard
19) CustomFormItems
20) UserRolesWithQuotes
21) BusinessUnitNames
22) CRMSystemCharacteristic
23) FormFieldsRemoved
24) FileStorage
25) CollabPeoplePerObj
26) ObjectTypeLineItems The stored procedures 548 may have additional detail.
spTiresiasUploadData This stored procedure 548 may be used to upload the data to database 550 from the delimited temporary data files generated by batch job 540. It may take comma separated file names, hash of license key and the sections selected by the users as the input.

spTiresiasDeleteData

This stored procedure 548 may be used to delete the previous data for same customer. It may take table name as input parameter and deletes all of the previously existing records for the sections selected by "client tool" user.

spTiresiasBulkInsertData

This stored procedure may be used to upload the data to the table from the respective delimited temporary data files generated by batch job 540. It may take comma separated file name and the table name as the input parameter. It may be invoked by "UploadData".

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computer-implemented method for collecting feedback on a customer relationship management system comprising: requesting permission to collect feedback data; if permission to collect feedback data is received, collecting data about a customer relationship management installation; requesting permission to collect specific types of customer relationship management business data; if permission to collect specific customer relationship management business data is not received, refraining from collecting such specific data; if permission to collect specific customer relationship management business data is received, collecting such specific data wherein the specific business data further comprises record number data, business profile data, record association data and organizational structure data; requesting permission to collect customer relationship management: installation statistical data; if permission to collect specific customer relationship management installation statistical data is not received, refraining from collecting such specific statistical data; if permission to collect specific customer relationship management installation statistical data is received, collecting specific customer relationship management installation statistical data wherein the specific statistical data comprises grown rate data, customization data, user organization data and synchronization with other programs data; requesting permission to collect specific customer relationship management installation system data; if permission to collect specific customer relationship management installation system data is not received, refraining from collecting specific customer relationship management installation data; if permission to collect specific customer relationship management installation system data is received, collecting specific customer relationship management installation data; allowing the selection to review specific portions of the collected data before it is communicated; communicating a privacy policy to the customer relationship management installation; determining if partners are involved in the customer relationship management installation; determining if additional programs are installed in the customer relationship management; determining if a valid web server is in communication with the customer relationship management installation; displaying a communication progress display where data is communicated and stopping the communication when a cancel option is selected; storing the data to be communicated in a class which has subclasses for the different types of data collected; identifying customer relationship management installations by a hash organization identification of a customers unique ID; storing the data to be communicated in XML file format; receiving the data and storing the data in a format to be queried; storing the data in a database; allowing customer relationship management installation to create additional requests for permission to create additional data to be communicated; allowing customer relationship management installation to refer queries to additional databases of the customer relationship management installation to collect additional data; and validating the hash ID received; wherein the previous steps are performed by a computer.

2. A computer system comprising a processor, a memory and an input/output circuit, the processor being programmed to execute computer executable commands and the memory being capable of storing computer executable commands, the memory comprising computer executable code to be executed by the processor for: requesting permission to collect feedback data; if permission to collect feedback data is received, collecting data about a customer relationship management installation; requesting permission to collect specific types of customer relationship management business data; if permission to collect specific customer relationship management business data is not received, refraining from collecting such specific data; if permission to collect specific customer relationship management business data is received, collecting such specific data; requesting permission to collect customer relationship management installation statistical data; if permission to collect specific customer relationship management installation statistical data is not received, refraining from collecting such specific statistical data; if permission to collect specific customer relationship management installation statistical data is received, collecting specific customer relationship management installation statistical data; requesting permission to collect specific customer relationship management installation system data; if permission to collect specific customer relationship management installation system data is not received, refraining from collecting specific customer relationship management installation data; if permission to collect specific customer relationship management installation system data is received, collecting specific customer relationship management installation data wherein the specific customer relationship management system data comprises server related data, customer relationship management database data and customer relationship management server application data; allowing the selection to review specific portions of the collected data before it is communicated; communicating a privacy policy to the customer relationship management installation; determining if partners are involved in the customer relationship management installation; determining if additional programs are installed in the customer relationship management installation; determining if a valid web server is in communication with the customer relationship management installation; displaying a communication progress display where data is communicated and stopping the data communication when a cancel selection is made; storing the data to be communicated in a class which has subclasses for the different types of data collected; identifying customer relationship management installations by a hash organization identification of a customers unique ID; storing the data to be communicated in XML file format; receiving the data and storing the data in a format to be queried; storing the data in a database; allowing customer relationship management installation to create additional requests for permission to create additional data to be communicated; allowing customer relationship management installation to refer queries to additional databases of the customer relationship management installation to collect additional data; and validating the hash ID received.

3. A non-transitory computer readable medium comprising computer executable code which when executed by a computer perform a method comprising: requesting permission to collect feedback data; if permission to collect feedback data is received, collecting data about a customer relationship management installation; requesting permission to collect specific types of customer relationship management business data; if permission to collect specific customer relationship management business data is not received, refraining from collecting such specific data; if permission to collect specific customer relationship management business data is received, collecting such specific data; requesting permission to collect customer relationship management installation statistical data; if permission to collect specific customer relationship management installation statistical data is not received, refraining from collecting such specific statistical data; if permission to collect specific customer relationship management installation statistical data is received, collecting specific customer relationship management installation statistical data; requesting permission to collect specific customer relationship management installation system data; if permission to collect specific customer relationship management installation system data is not received, refraining from collecting specific customer relationship management installation data; if permission to collect specific customer relationship management installation system data is received, collecting specific customer relationship management installation data wherein the specific customer relationship management system data comprises server related data, customer relationship management database data and customer relationship management server application data; allowing the selection to review specific portions of the collected data before it is communicated; communicating a privacy policy to the customer relationship management installation; determining if partners are involved in the customer relationship management installation; determining if additional programs are installed in the customer relationship management installation; determining if a valid web server is in communication with the customer relationship management installation; displaying a communication progress display where data is communicated and stopping the data communication when a cancel selection is made; storing the data to be communicated in a class which has subclasses for the different types of data collected; identifying customer relationship management installations by a hash organization identification of a customers unique ID; storing the data to be communicated in XML file format; receiving the data and storing the data in a format to be queried; storing the data in a database; allowing customer relationship management installation to create additional requests for permission to create additional data to be communicated; allowing customer relationship management installation to refer queries to additional databases of the customer relationship management installation to collect additional data; and validating the hash ID received.

* * * * *